United States Patent
Xu et al.

(10) Patent No.: US 11,076,369 B2
(45) Date of Patent: Jul. 27, 2021

(54) POWER CONTROL AND USER MULTIPLEXING FOR HETEROGENEOUS NETWORK COORDINATED MULTIPOINT OPERATIONS

(71) Applicant: QUALCOMM Incorporated, San Diego, CA (US)

(72) Inventors: Hao Xu, Beijing (CN); Xiliang Luo, San Diego, CA (US); Xiaoxia Zhang, San Diego, CA (US); Peter Gaal, San Diego, CA (US); Tingfang Ji, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 16/197,731

(22) Filed: Nov. 21, 2018

(65) Prior Publication Data

US 2019/0124608 A1    Apr. 25, 2019

Related U.S. Application Data

(62) Division of application No. 13/372,458, filed on Feb. 13, 2012, now Pat. No. 10,187,859.

(Continued)

(51) Int. Cl.
*H04W 52/40* (2009.01)
*H04B 7/024* (2017.01)
(Continued)

(52) U.S. Cl.
CPC ............ *H04W 52/40* (2013.01); *H04B 7/024* (2013.01); *H04B 7/0632* (2013.01);
(Continued)

(58) Field of Classification Search
CPC ..... H04B 7/024; H04B 7/0632; H04W 52/10; H04W 52/146; H04W 52/242;
(Continued)

(56) References Cited

U.S. PATENT DOCUMENTS 8,099,462 B2   1/2012 Sheng et al.
8,204,470 B2   6/2012 Onggosanusi et al.
(Continued)

FOREIGN PATENT DOCUMENTS

CN     1886908 A    12/2006
CN   101867938 A    10/2010
(Continued)

OTHER PUBLICATIONS

Catt et al: "Considerations on Enhanced SRS Transmission Schemes", 3GPP Draft; R1-100023, 3rd Generation Partnership Project (3GPP), Mobile Competence Centre; 650, Route Deslucioles; F-06921 Sophia-Antipolis Cedex; France, vol. RAN WG1, No. Valencia, Spain; Jan. 18, 2010, Jan. 12, 2010 (Jan. 12, 2010), XP050417779, [retrieved on Jan. 12, 2010) sections 2.1-2.3.

(Continued)

*Primary Examiner* — Paul H Masur
(74) *Attorney, Agent, or Firm* — Patterson & Sheridan, L.L.P

(57) ABSTRACT

Certain aspects of the present disclosure relate to techniques for power control and user multiplexing for coordinated multi-point (CoMP) transmission and reception in heterogeneous networks (HetNet).

24 Claims, 29 Drawing Sheets

Related U.S. Application Data

(60) Provisional application No. 61/442,650, filed on Feb. 14, 2011.

(51) Int. Cl.

| | |
|---|---|
| *H04B 7/06* | (2006.01) |
| *H04W 24/10* | (2009.01) |
| *H04W 48/08* | (2009.01) |
| *H04W 52/10* | (2009.01) |
| *H04W 52/14* | (2009.01) |
| *H04W 52/24* | (2009.01) |
| *H04W 52/50* | (2009.01) |
| *H04W 88/02* | (2009.01) |
| *H04L 25/02* | (2006.01) |

(52) U.S. Cl.
CPC ......... *H04L 25/0226* (2013.01); *H04W 24/10* (2013.01); *H04W 48/08* (2013.01); *H04W 52/10* (2013.01); *H04W 52/146* (2013.01); *H04W 52/242* (2013.01); *H04W 52/244* (2013.01); *H04W 52/50* (2013.01); *H04W 88/02* (2013.01)

(58) Field of Classification Search
CPC ... H04W 52/244; H04W 52/40; H04W 52/50; H04W 24/10; H04W 48/08; H04W 88/02
See application file for complete search history.

(56) References Cited

U.S. PATENT DOCUMENTS

| | | |
|---|---|---|
| 8,300,587 B2 | 10/2012 | Chmiel et al. |
| 8,305,987 B2 | 11/2012 | Fong et al. |
| 8,331,347 B2 | 12/2012 | Kishiyama et al. |
| 8,406,782 B2 | 3/2013 | Horneman et al. |
| 8,467,736 B2 | 6/2013 | Koo et al. |
| 8,477,705 B2 | 7/2013 | Luo et al. |
| 8,576,822 B2 | 11/2013 | Yoon et al. |
| 8,634,363 B2 | 1/2014 | Kim et al. |
| 8,654,734 B2 | 2/2014 | Chandrasekhar et al. |
| 8,861,430 B2 | 10/2014 | Liao et al. |
| 9,059,826 B2 | 6/2015 | Han et al. |
| 9,270,356 B2 | 2/2016 | Chung et al. |
| 9,385,852 B2 | 7/2016 | Hammarwall |
| 2006/0126558 A1 | 6/2006 | Lee et al. |
| 2009/0196177 A1 | 8/2009 | Teyeb et al. |
| 2010/0056215 A1 | 3/2010 | Gorokhov et al. |
| 2010/0067435 A1 | 3/2010 | Balachandran et al. |
| 2010/0074183 A1 | 3/2010 | Chen et al. |
| 2010/0103821 A1 | 4/2010 | Palanki et al. |
| 2010/0105404 A1 | 4/2010 | Palanki et al. |
| 2010/0222070 A1 | 9/2010 | Yun et al. |
| 2010/0254471 A1 | 10/2010 | Ko et al. |
| 2010/0265842 A1 | 10/2010 | Khandekar et al. |
| 2010/0272009 A1 | 10/2010 | Cheng et al. |
| 2010/0290373 A1 | 11/2010 | Chin et al. |
| 2010/0323684 A1 | 12/2010 | Cai et al. |
| 2010/0323720 A1 | 12/2010 | Jen |
| 2011/0028672 A1 | 2/2011 | Dahlman et al. |
| 2011/0034171 A1 | 2/2011 | Choi et al. |
| 2011/0034175 A1 | 2/2011 | Fong et al. |
| 2011/0098054 A1 | 4/2011 | Gorokhov et al. |
| 2011/0103406 A1 | 5/2011 | Cai et al. |
| 2011/0116400 A1* | 5/2011 | Park .................... H04W 52/08 370/252 |
| 2011/0124345 A1 | 5/2011 | Lee et al. |
| 2011/0124365 A1 | 5/2011 | Gresset et al. |
| 2011/0149886 A1 | 6/2011 | Xu et al. |
| 2011/0149908 A1 | 6/2011 | Olsson et al. |
| 2011/0170435 A1 | 7/2011 | Kim et al. |
| 2011/0170735 A1 | 7/2011 | Dehe et al. |
| 2011/0171992 A1* | 7/2011 | Seo .................... H04W 52/242 455/522 |
| 2011/0190005 A1 | 8/2011 | Cheon et al. |
| 2011/0194551 A1 | 8/2011 | Lee et al. |
| 2011/0199986 A1 | 8/2011 | Fong et al. |
| 2011/0244877 A1 | 10/2011 | Farajidana et al. |
| 2011/0269489 A1 | 11/2011 | Khoshnevis et al. |
| 2011/0317656 A1 | 12/2011 | Rajih et al. |
| 2012/0051250 A1 | 3/2012 | Sun et al. |
| 2012/0051265 A1 | 3/2012 | Shen et al. |
| 2012/0076038 A1 | 3/2012 | Shan et al. |
| 2012/0196607 A1 | 8/2012 | Samardzija et al. |
| 2012/0201149 A1 | 8/2012 | Skaerby et al. |
| 2012/0236741 A1 | 9/2012 | Xu et al. |
| 2013/0003580 A1* | 1/2013 | Kovacs .................. H04B 1/707 370/252 |
| 2013/0044685 A1 | 2/2013 | Fong et al. |
| 2013/0046813 A1 | 2/2013 | Yuan et al. |
| 2013/0094411 A1 | 4/2013 | Zhang |
| 2013/0286997 A1* | 10/2013 | Davydov ............ H04W 72/042 370/329 |
| 2014/0330898 A1 | 11/2014 | Clift et al. |
| 2015/0271557 A1 | 9/2015 | Tabe |

FOREIGN PATENT DOCUMENTS

| | | |
|---|---|---|
| CN | 101867964 A | 10/2010 |
| CN | 101877608 A | 11/2010 |
| CN | 101919193 A | 12/2010 |
| CN | 101931514 A | 12/2010 |
| CN | 101931993 A | 12/2010 |
| CN | 101931996 A | 12/2010 |
| EP | 2230807 A2 | 9/2010 |
| EP | 2424285 A1 | 2/2012 |
| EP | 2439997 A1 | 4/2012 |
| JP | 2007515106 A | 6/2007 |
| JP | 2008527794 A | 7/2008 |
| KR | 20100065047 A | 6/2010 |
| KR | 20100081913 A | 7/2010 |
| KR | 20110014333 A | 2/2011 |
| WO | 2005055462 A1 | 6/2005 |
| WO | 2006071162 A1 | 7/2006 |
| WO | 2010048502 | 4/2010 |
| WO | 2010121538 A1 | 10/2010 |
| WO | 2010123270 A2 | 10/2010 |
| WO | 2010124241 A2 | 10/2010 |
| WO | 2010134792 A2 | 11/2010 |
| WO | 2010140298 A1 | 12/2010 |
| WO | 2010148319 A1 | 12/2010 |
| WO | 2011009486 A1 | 1/2011 |
| WO | 2011016402 A1 | 2/2011 |
| WO | 2011017515 A2 | 2/2011 |

OTHER PUBLICATIONS

Cewit: "Considerations for Downlink CoMP in Rel. 11", 3GPP Draft; CoMP 6312 V3, 3rd Generation Partnership Project (3GPP), Mobile Competence Centre ; 650, Route Deslucioles ; F-06921 Sophia-Anti Poliscedex ; France,vol. RAN WG1, No. Dublin, Ireland; Jan. 17, 2011, Jan. 13, 2011 (Jan. 13, 2011), XP050490356, [retrieved on Jan. 13, 2011 ), section 3.1.

CMCC: "Some Considerations on CoMP Deployment Scenarios," 3GPP TSG-RAN1 Meeting #63bis, Dublin, Ireland, Jan. 17-21, 2011, R1-110426, Jan. 31, 2011, 2 pages.

European Search Report—EP16183738—Search Authority—The Hague—dated Oct. 7, 2016.

European Search Report—EP16183739—Search Authority—The Hague—dated Oct. 13, 2016.

Fette, et al., "The WebSocket Protocol," Internet Engineering Task Force (IETF), RFC 6455, Dec. 2011, pp. 1-71.

Hitachi: "Views of Further Studies on Downlink CoMP", 3GPP TSG RAN WG1 Meeting #63bis, R1-110176, Dublin, Ireland, Jan. 17-21, 2011, pp. 1-2.

"Huawei: ""Interference analysis on SRS for CoMP"" , 3GPP Draft; R1-093039, 3rd Generation Partnership Project 3GPP) , Mobile Competence Centre ; 650, Route Deslucioles ; F-06921 Sophia-Anti Poliscedex; France, No. Shenzhen, China; Aug. 18, 2009, Aug. 18, 2009 (Aug. 18, 2009) , XP050351432, [retrieved on Aug. 18, 2009) section 5."

(56) References Cited

OTHER PUBLICATIONS

Huawei et al: "TP for 3GPP TR36.814 on CoMP", 3GPP Draft; R1-101695 TP 36 814 CoMP, 3rd Generation Partnership Project (3GPP), Mobile Competence Centre ; 650, Route Deslucioles ; F-06921 Sophia-Anti Poliscedex ; France, vol. RAN WG1, No. San Francisco, USA; Feb. 22, 2010, Mar. 1, 2010 (Mar. 1, 2010), XP050419118,[ r etrieved on Mar. 11, 2010 section 8.1.3.
Huawei: "RAN2 considerations for coordinated multipoint transmission and reception", 3GPP Draft; R2-093107 RAN2 Considerations for COMP, 3rd Generation Partnership Project (3GPP), Mobile Competence Centre ; 650, Route Des Lucioles ; F-06921 Sophia-Antipolis Cedex; France, No. San Francisco, USA; Apr. 28, 2009, Apr. 28, 2009 (Apr. 28, 2009), XP050340849, [retrieved on Apr. 28, 2009].
International Search Report and Written Opinion—PCT/US2012/025087—ISA/EPO—dated Jun. 11, 2012.
Partial International Search Report—PCT/US2012/025087—International Search Authority European Patent Office dated Apr. 5, 2012.
Qualcomm Incorporated: "Signaling and Configuration of CSI-RS", 3GPP Draft; R1-104797 Signaling and Configuration of CSI-RS, 3rd Generation Partnership Project (3GPP) , Mobile Competence Centre ; 650, Route Deslucioles ; F-06921 Sophia-Antipoliscedex; France, vol. RAN WG1, No. Madrid, Spain; Aug. 23, 2010, Aug. 17, 2010 (Aug. 17, 2010), XP050449989,[retrieved on Aug. 17, 2010)sections 4 and 5.
Taiwan Search Report—TW101104745—TIPO—dated Oct. 8, 2014.
Taiwan Search Report—TW104102859—TIPO—dated Feb. 4, 2016.
Yi Ding, et al., "Performance analysis of an improved uplink power control method in LTE-A COMP network", Broadband Network and Multimedia Technology (IC-BNMT) , 2010 3rd IEEE International Conference on, IEEE, Oct. 26, 2010 (Oct. 26, 2010), pp. 624-628, XP031889176, DOI: 10.1109/ICBNMT.2010.5705165 ISBN: 978-1-4244-6769-3.
Zheng Naizheng, et al., "Uplink Coordinated Multi-Point for LTE-A in the Form of Macro-Scopic Combining", 2010 IEEE Vehicular Technology Conference (VTC 2010-Spring)—May 16-19, 2010—Taipei, Taiwan, IEEE, US, May 16, 2010 (May 16, 2010), pp. 1-5, XP031696207, ISBN: 978-1-4244-2518-1.
ZTE: "Considerations on CSI-RS configuration signaling", 3GPP Draft; R1-105019 Considerations on CSI-RS Configuration Signaling, 3rd Generation Partnership Project (3GPP), Mobile Competence Centre ; 650, Route Deslucioles ; F-06921 Sophia-Anti Poliscedex ;France, vol. RAN WG1, No. Madrid, Spain; Aug. 23, 2010, Aug. 27, 2010 (Aug. 27, 2010), XP050450278,[retrieved on Aug. 27, 2010) p. 6, lines 10-15.
"ZTE: ""Views on Re1-11 COMP"",3GPP Draft; R1-110573, 3rd Generation Partnership Project (3GPP) , Mobile Competence Centre ; 650, Route Deslucioles ; F-06921 Sophia-Antipoliscedex ; France, vol. RAN WG1, No. Dublin, Ireland; Jan. 17, 2011, Jan. 21, 2011 (Jan. 21, 2011), XP050490430, [retrieved on Jan. 21, 2011) section 2.4."
CATR: "SRS Enhancements for LTE-Advanced", R1-100210, 3GPP TSG RAN WG1 Meeting #59bis, Jan. 11, 2011, Valencia, Spain, Jan. 18-22, 2010, 5 pages.
Huawei: "Reliability Analysis and Possible Solutions on SRS for LTE-A", R1-100264 , 3GPP TSG RAN WG1 Meeting #59bis, Jan. 11, 2010, Valencia, Spain, Jan. 18-22, 2010, 3 pages.
Pantech, "Enhanced UL and DL Transmission for CoMP", R1-110162, 3GPP TSG RAN1 #63bis, Jan. 11, 2011, Dublin, Ireland Jan. 17—Jan. 21, 2011, 2 pages.

\* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

FIG. 5

POWER CONTROL AND USER MULTIPLEXING FOR HETEROGENEOUS NETWORK COORDINATED MULTIPOINT OPERATIONS

CLAIM OF PRIORITY UNDER 35 U.S.C. § 119

The present application is a divisional application of U.S. application Ser. No. 13/372,458, entitled "POWER CONTROL AND USER MULTIPLEXING FOR HETEROGENEOUS NETWORK COORDINATED MULTIPOINT OPERATIONS," filed Feb. 13, 2012, which claims priority to U.S. Provisional Application No. 61/442,650, entitled "POWER CONTROL AND USER MULTIPLEXING HETNET COMP," filed Feb. 14, 2011, all assigned to the assignee hereof and incorporated herein by reference.

BACKGROUND

I. Field

Certain aspects of the disclosure generally relate to wireless communications and, more particularly, to techniques for power control and user multiplexing for coordinated multi-point (CoMP) transmission and reception in heterogeneous networks (HetNet).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations (BS) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

In an aspect of the disclosure, a method for wireless communications is provided.

Certain aspects of the present disclosure provide techniques for wireless communications by a user equipment (UE). The techniques generally include measuring channel state information reference signals (CSI-RS) transmitted from at least one of a set of transmission points involved in coordinated multipoint (CoMP) operations with the UE and performing open loop power control based on the measured CSI-RS from at least one of the transmission points.

Certain aspects of the present disclosure provide techniques for wireless communications by a base station. The techniques include determining one or more parameters for use by a user equipment (UE) in open loop (OL) power control, wherein the one or more parameters are determined to take into account coordinated multipoint (CoMP) operations and signaling the one or more parameters to the UE.

Certain aspects of the present disclosure provide techniques for wireless communications by a base station. The techniques include receiving a transmission from a UE and determining one or more cells to include in a coordinated multipoint (CoMP) group, based on the received transmission.

Certain aspects of the present disclosure provide techniques for wireless communications by a user equipment. The techniques include receiving distinct channel state information reference signals (CSI-RS) transmitted from a plurality of cells; and transmitting feedback, based on the received CSI-RS, that may be used to determine one or more cells to include in an uplink (UL) coordinated multipoint (CoMP) group.

Certain aspects of the present disclosure provide techniques for wireless communications by a base station. The techniques include determining a channel state information reference signal (CSI-RS), the CSI-RS being different from CSI-RS transmitted by one or more other transmission points sharing a common physical cell identifier (PCI) with the base station, the CSI-RS being decoupled from the PCI; and transmitting the CSI-RS from the base station.

Certain aspects of the present disclosure provide techniques for wireless communications by a user equipment. The techniques include transmitting a sounding reference signal (SRS) from the UE in proximity to a plurality of transmission points sharing a common physical cell identifier (PCI); and receiving, from at least one of the transmission points, information regarding configuration for uplink coordinated multipoint (UL CoMP) operation, the configuration being decoupled from the PCI.

Certain aspects of the present disclosure provide techniques for wireless communications by a transmission point involved in CoMP operations. The techniques include signaling one or more UEs regarding a channel quality indication (CQI) configuration for CQI transmission, wherein the signaled CQI configuration is decoupled from physical cell identifier (PCI) of the transmission point.

Various aspects and features of the disclosure are described in further detail below.

BRIEF DESCRIPTION OF THE DRAWINGS

FIG. 5 illustrates example resource partitioning in a heterogeneous network in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
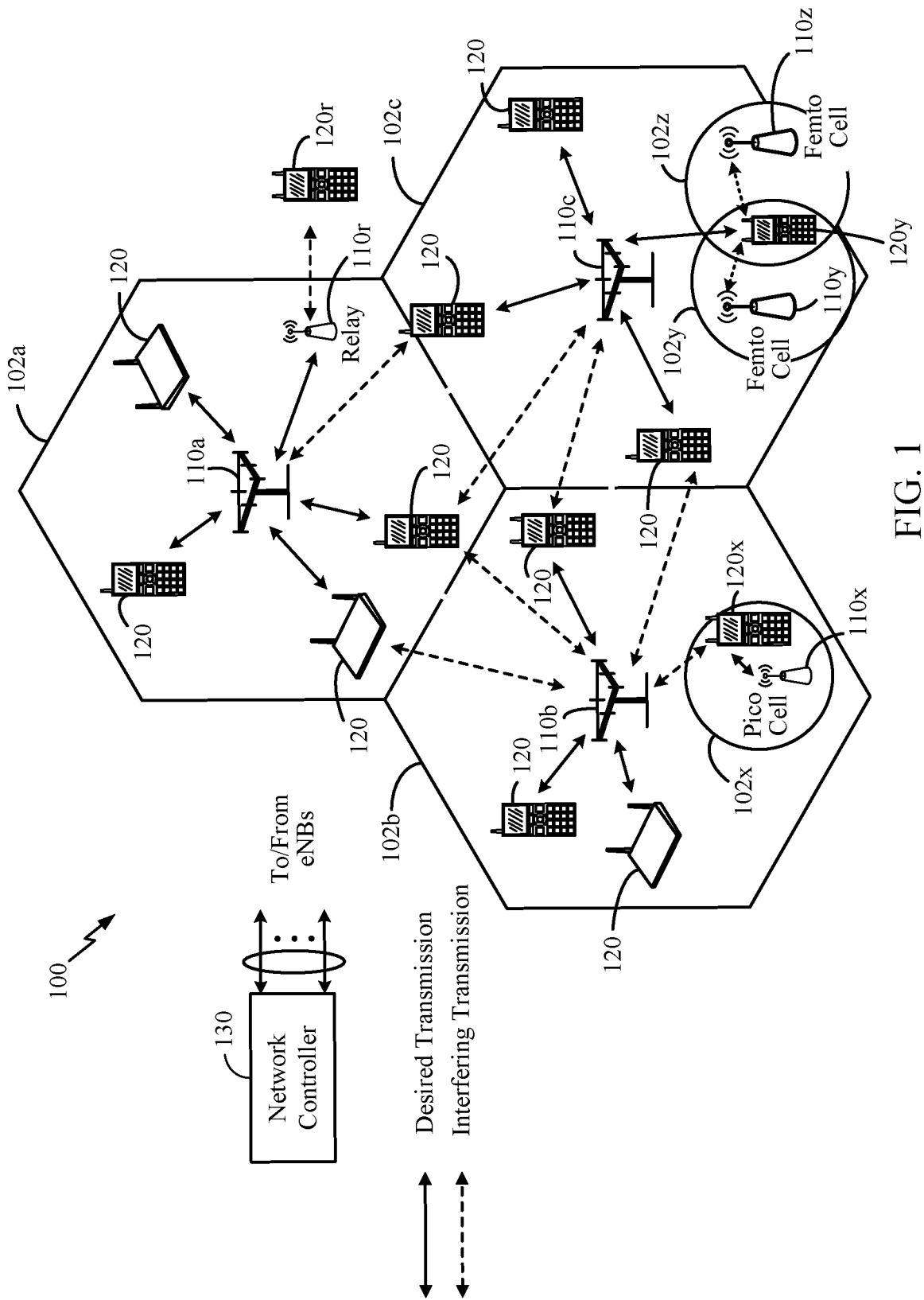
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
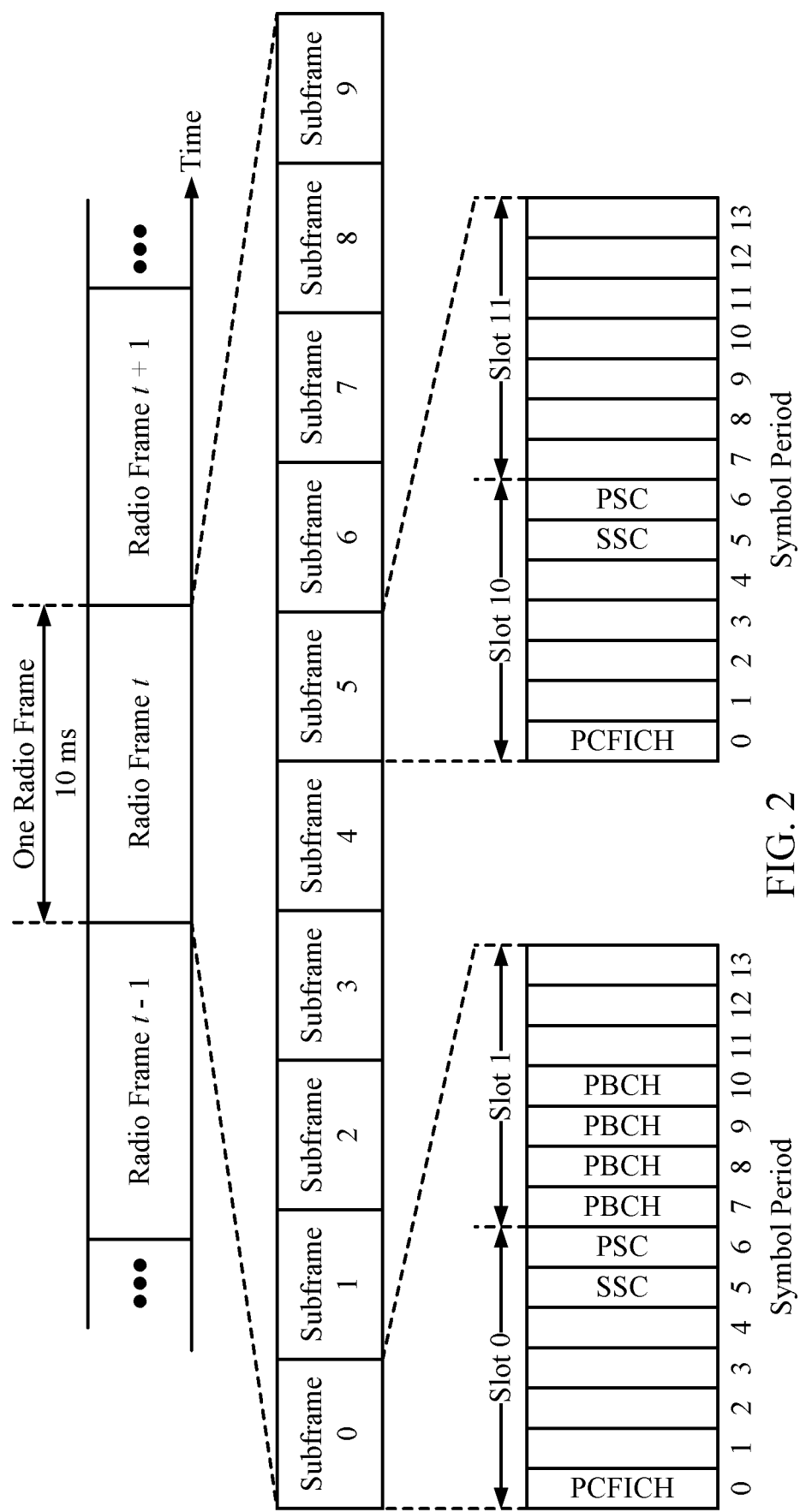
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
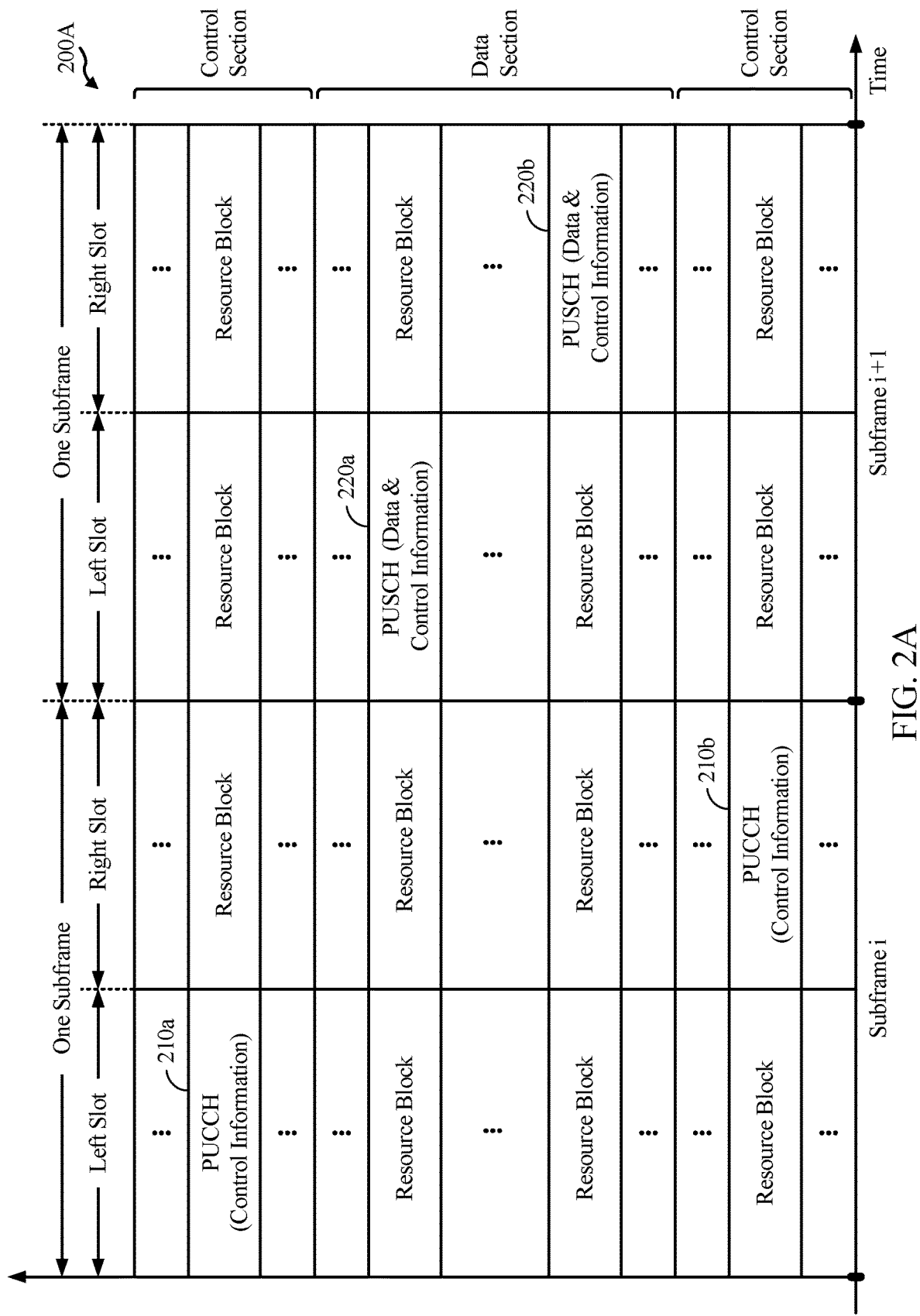
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
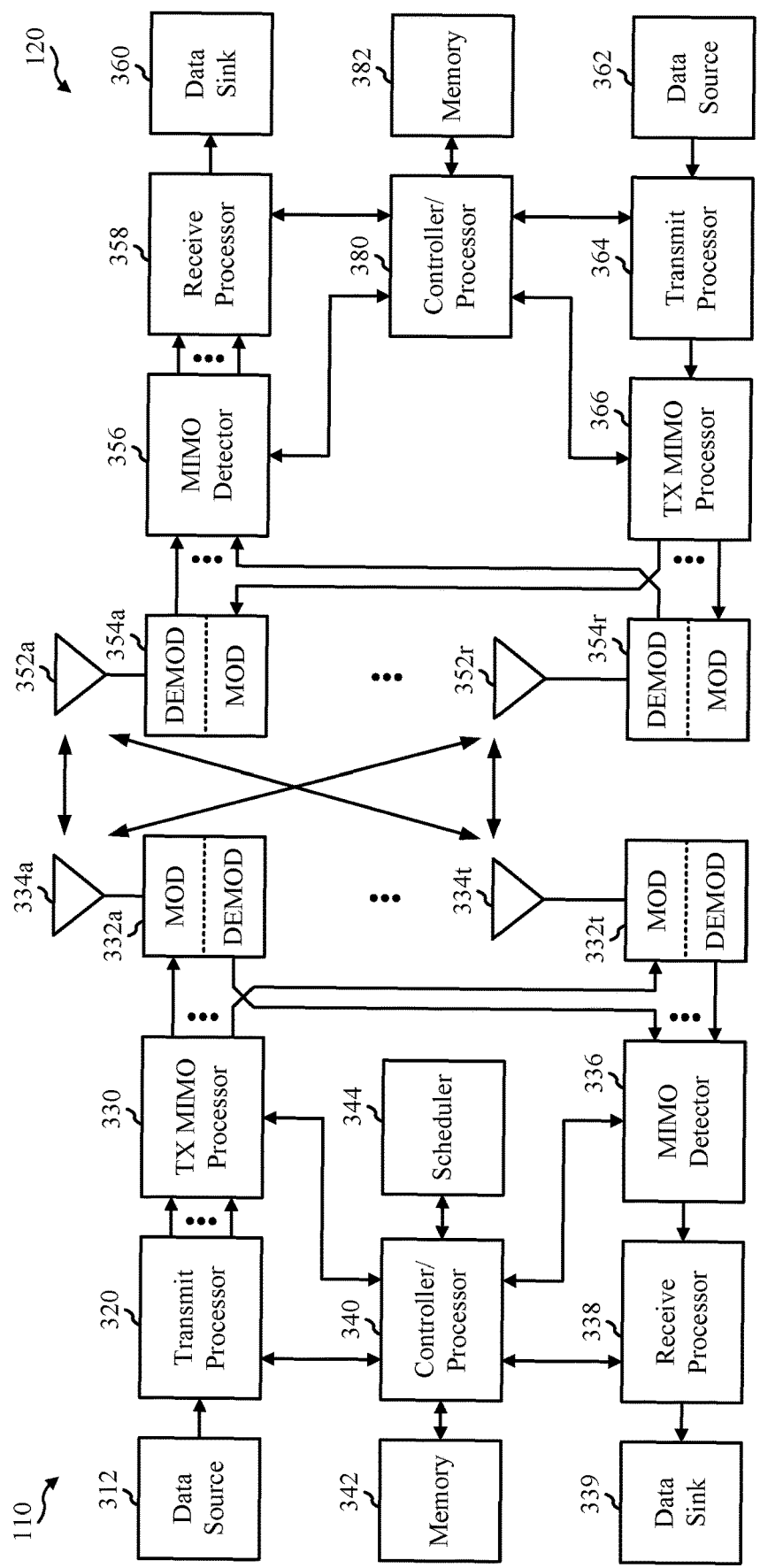
FIG. 3 shows a block diagram conceptually illustrating an example of a Node B in communication with a user equipment device (UE) in a wireless communications network in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354*a* through 354*r* (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations and/or processes for the techniques described herein. The memories 342 and 382 may store data and program codes for the eNB 110 and the UE 120, respectively. A scheduler 344 may schedule UEs for data transmission on the downlink and/or uplink.

Example Resource Partitioning

According to certain aspects of the present disclosure, when a network supports enhanced inter-cell interference coordination (eICIC), the base stations may negotiate with each other to coordinate resources in order to reduce or eliminate interference by the interfering cell giving up part of its resources. In accordance with this interference coordination, a UE may be able to access a serving cell even with severe interference by using resources yielded by the interfering cell.

For example, a femto cell with a closed access mode (i.e., in which only a member femto UE can access the cell) in the coverage area of an open macro cell may be able to create a "coverage hole" (in the femto cell's coverage area) for a macro cell by yielding resources and effectively removing interference. By negotiating for a femto cell to yield resources, the macro UE under the femto cell coverage area may still be able to access the UE's serving macro cell using these yielded resources.

In a radio access system using OFDM, such as Evolved Universal Terrestrial Radio Access Network (E-UTRAN), the yielded resources may be time based, frequency based, or a combination of both. When the coordinated resource partitioning is time based, the interfering cell may simply not use some of the subframes in the time domain. When the coordinated resource partitioning is frequency based, the interfering cell may yield subcarriers in the frequency domain. With a combination of both frequency and time, the interfering cell may yield frequency and time resources.

Figure 4:
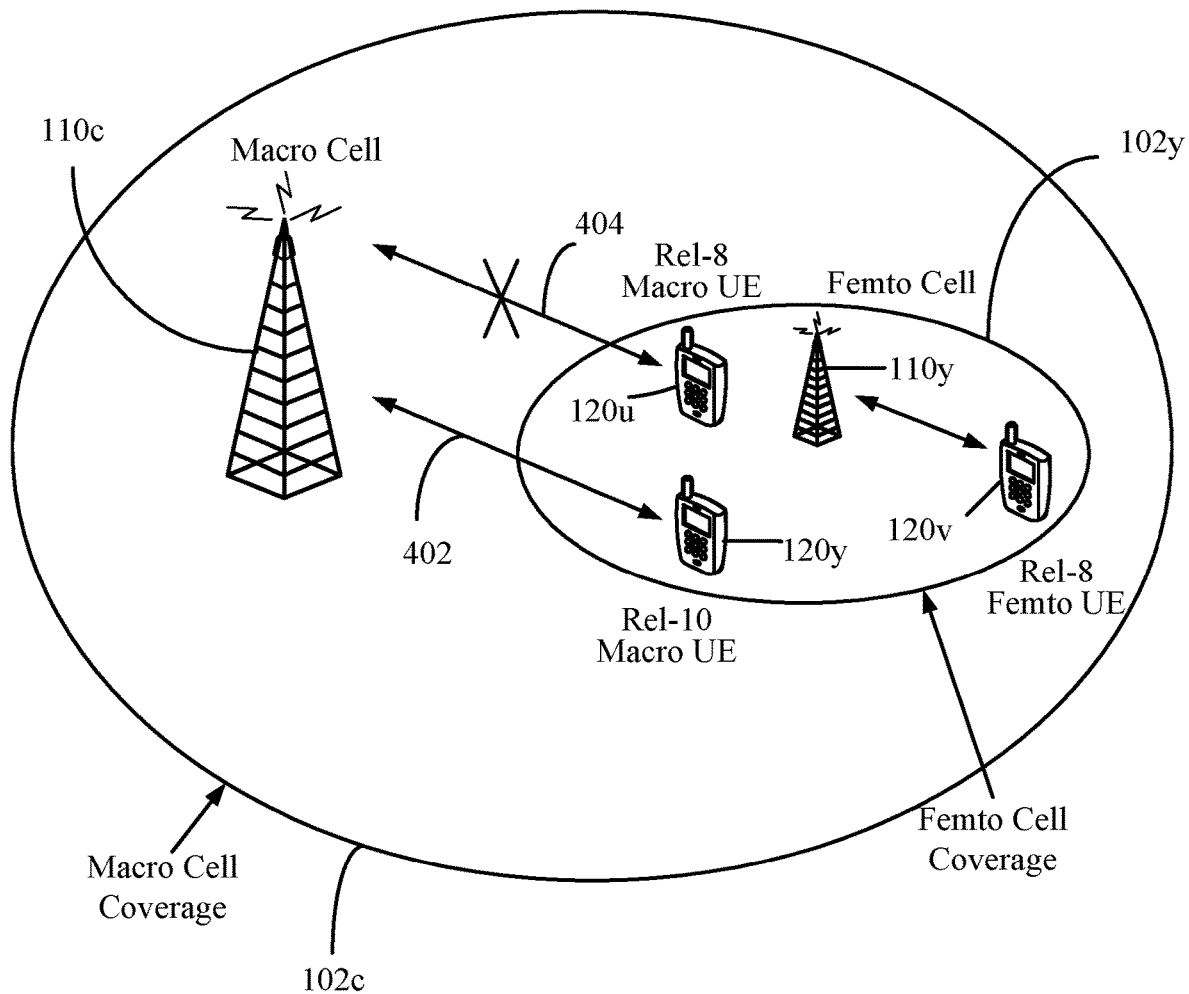
FIG. 4 illustrates an example heterogeneous network (HetNet) in accordance with certain aspects of the present disclosure.

FIG. 4 illustrates an example scenario where eICIC may allow a macro UE 120*y* supporting eICIC (e.g., a Rel-10 macro UE as shown in FIG. 4) to access the macro cell 110*c* even when the macro UE 120*y* is experiencing severe interference from the femto cell y, as illustrated by the solid radio link 402. A legacy macro UE 120*u* (e.g., a Rel-8 macro UE as shown in FIG. 4) may not be able to access the macro cell 110*c* under severe interference from the femto cell 110*y*, as illustrated by the broken radio link 404. A femto UE 120*v* (e.g., a Rel-8 femto UE as shown in FIG. 4) may access the femto cell 110*y* without any interference problems from the macro cell 110*c*.

According to certain aspects, networks may support eICIC, where there may be different sets of partitioning information. A first of these sets may be referred to as Semi-static Resource Partitioning Information (SRPI). A second of these sets may be referred to as Adaptive Resource Partitioning Information (ARPI). As the name implies, SRPI typically does not change frequently, and SRPI may be sent to a UE so that the UE can use the resource partitioning information for the UE's own operations.

As an example, the resource partitioning may be implemented with 8 ms periodicity (8 subframes) or 40 ms periodicity (40 subframes). According to certain aspects, it may be assumed that frequency division duplexing (FDD) may also be applied such that frequency resources may also be partitioned. For communications via the downlink (e.g., from a cell node B to a UE), a partitioning pattern may be mapped to a known subframe (e.g., a first subframe of each radio frame that has a system frame number (SFN) value that is a multiple of an integer N, such as 4). Such a mapping may be applied in order to determine resource partitioning information (RPI) for a specific subframe. As an example, a subframe that is subject to coordinated resource partitioning (e.g., yielded by an interfering cell) for the downlink may be identified by an index:

$$\text{Index}_{SRPI\_DL}=(SFN*10+\text{subframe number})\bmod 8$$

For the uplink, the SRPI mapping may be shifted, for example, by 4 ms. Thus, an example for the uplink may be:

$$\text{Index}_{SRPI\_UL}=(SFN*10+\text{subframe number}+4)\bmod 8$$

SRPI may use the following three values for each entry:

U (Use): this value indicates the subframe has been cleaned up from the dominant interference to be used by this cell (i.e., the main interfering cells do not use this subframe);

N (No Use): this value indicates the subframe shall not be used; and

X (Unknown): this value indicates the subframe is not statically partitioned. Details of resource usage negotiation between base stations are not known to the UE.

Another possible set of parameters for SRPI may be the following:

U (Use): this value indicates the subframe has been cleaned up from the dominant interference to be used by this cell (i.e., the main interfering cells do not use this subframe);

N (No Use): this value indicates the subframe shall not be used;

X (Unknown): this value indicates the subframe is not statically partitioned (and details of resource usage negotiation between base stations are not known to the UE); and C (Common): this value may indicate all cells may use this subframe without resource partitioning. This subframe may be subject to interference, so that the base station may choose to use this subframe only for a UE that is not experiencing severe interference.

The serving cell's SRPI may be broadcasted over the air. In E-UTRAN, the SRPI of the serving cell may be sent in a master information block (MIB), or one of the system information blocks (SIBs). A predefined SRPI may be defined based on the characteristics of cells, e.g. macro cell, pico cell (with open access), and femto cell (with closed access). In such a case, encoding of SRPI in the system overhead message may result in more efficient broadcasting over the air.

The base station may also broadcast the neighbor cell's SRPI in one of the SIBs. For this, SRPI may be sent with its corresponding range of physical cell identifiers (PCIs).

ARPI may represent further resource partitioning information with the detailed information for the 'X' subframes in SRPI. As noted above, detailed information for the 'X' subframes is typically only known to the base stations, and a UE does not know it.

Figure 6:
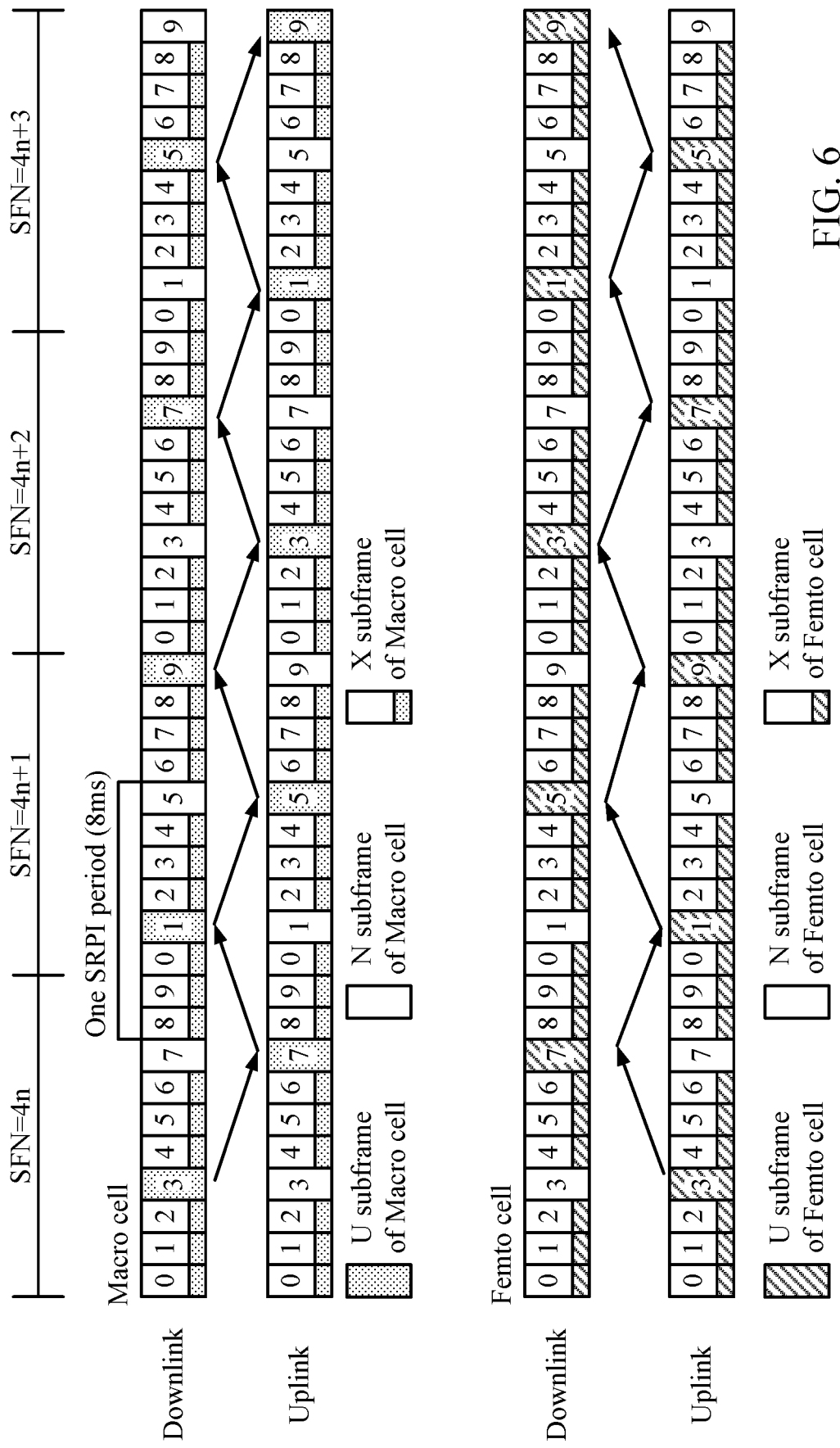
FIG. 6 illustrates example cooperative partitioning of subframes in a heterogeneous network in accordance with certain aspects of the present disclosure.

FIGS. 5 and 6 illustrate examples of SRPI assignment in the scenario with macro and femto cells. A U, N, X, or C subframe is a subframe corresponding to a U, N, X, or C SRPI assignment.

Figure 7:
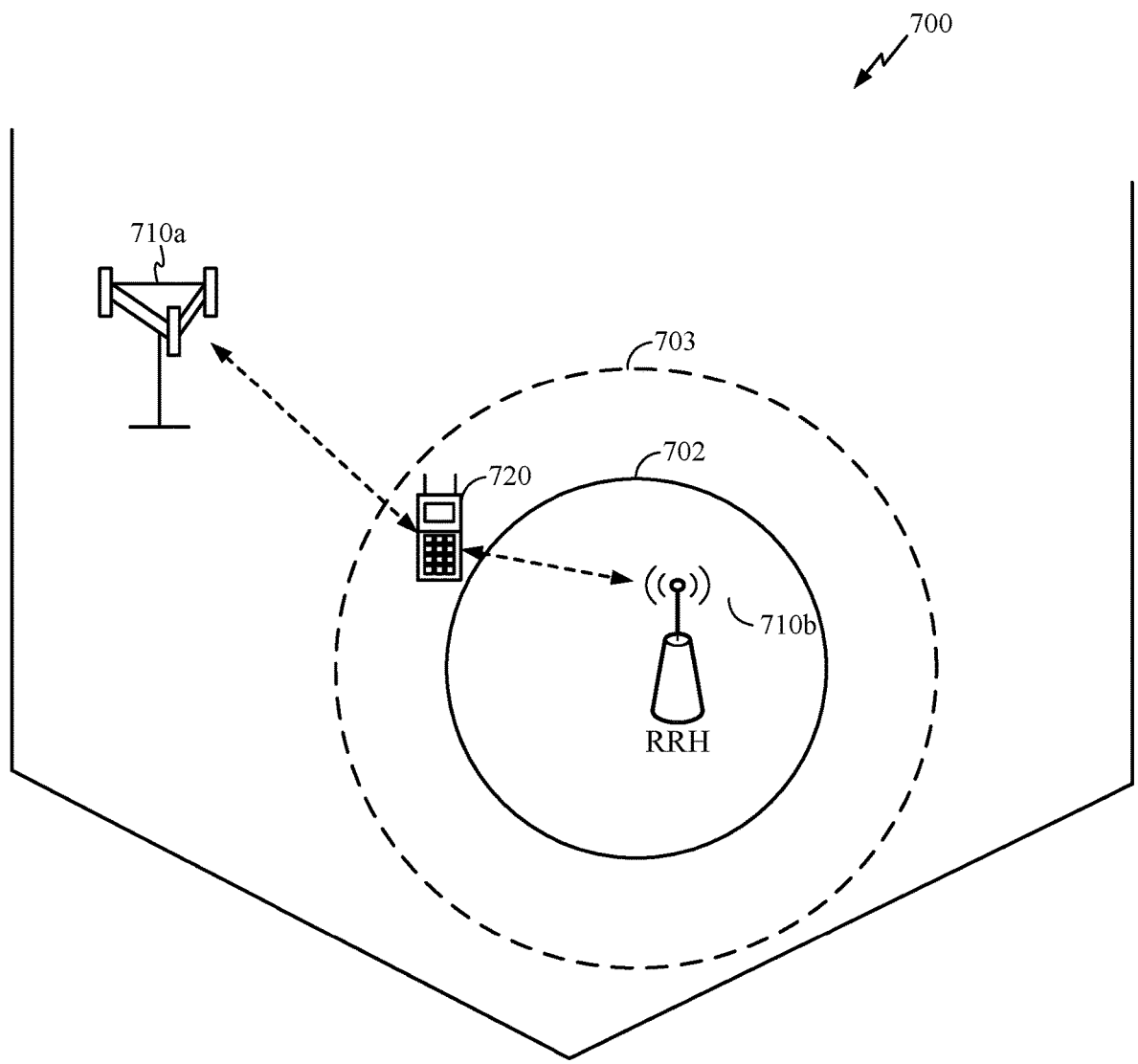
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Figure 8:
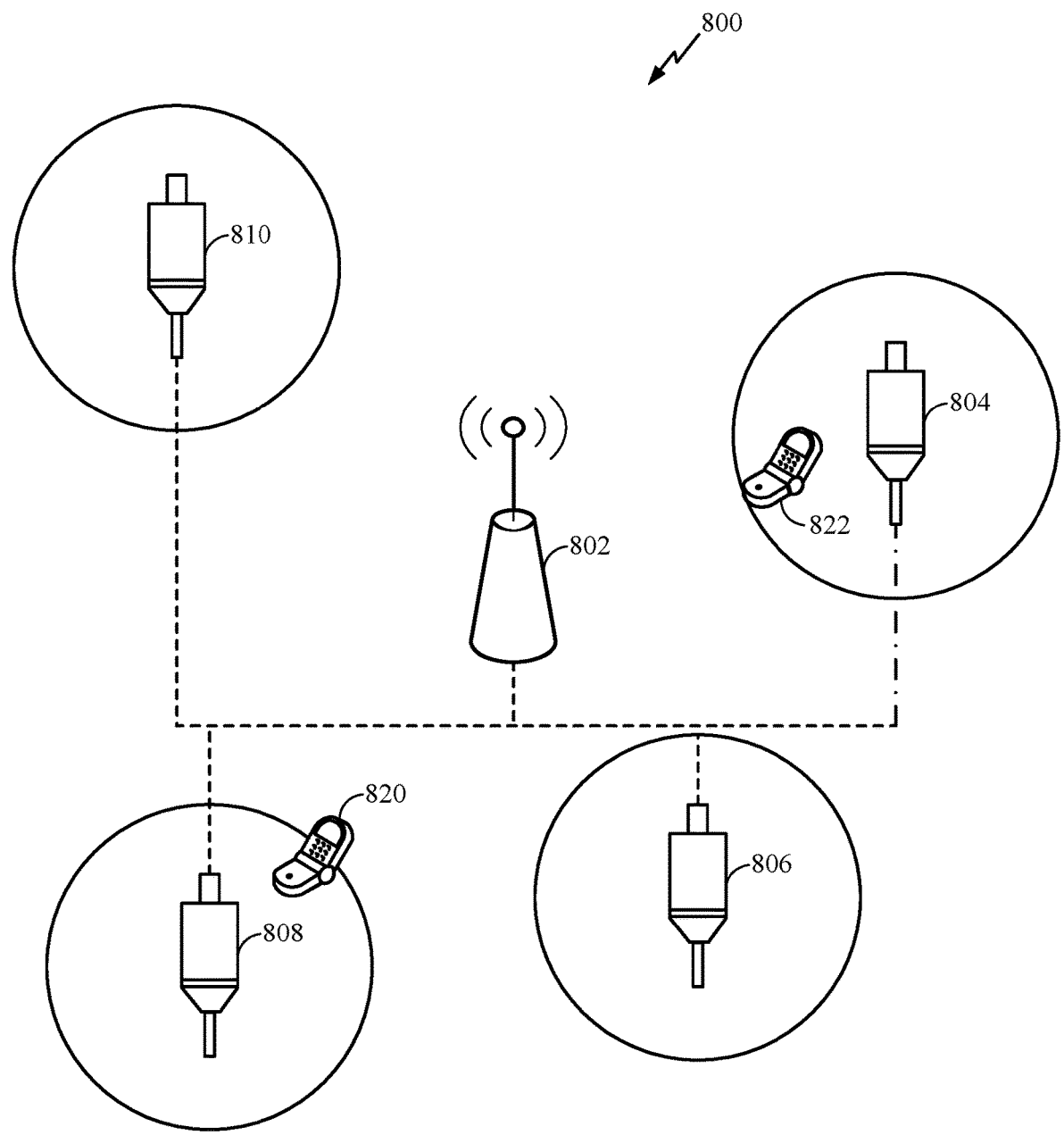
FIG. 8 is a diagram illustrating a network with a macro eNB and remote radio heads (RRHs) in accordance with certain aspects of the present disclosure.

FIG. 8 is a diagram illustrating a network 800, which includes a macro node and a number of remote radio heads (RRHs) in accordance with certain aspects of the present disclosure. The macro node 802 is connected to RRHs 804, 806, 808, 810 with optical fiber. In certain aspects, network 800 may be a homogeneous network or a heterogeneous network and the RRHs 804-810 may be low power or high power RRHs. In an aspect, the macro node 802 handles all scheduling within the cell, for itself and the RRHs. The RRHs may be configured with the same cell identifier (ID) as the macro node 802 or with different cell IDs. If the RRHs are configured with the same cell ID, the macro node 802 and the RRHs may operate as essentially one cell controlled by the macro node 802. On the other hand, if the RRHs and the macro node 802 are configured with different cell IDs, the macro node 802 and the RRHs may appear to a UE as different cells, though all control and scheduling may still remain with the macro node 802. It should further be appreciated that the processing for the macro node 802 and the RRHs 804, 806, 808, 810 may not necessarily have to reside at the macro node. It may also be performed in a centralized fashion at some other network device or entity that is connected with the macro and the RRHs.

As used herein, the term transmission/reception point ("TxP") generally refers geographically separated transmission/reception nodes controlled by at least one central entity (e.g., eNodeB), which may have the same or different cell IDs.

In certain aspects, when each of the RRHs share the same cell ID with the macro node 802, control information may be transmitted using CRS from the macro node 802 or both the macro node 802 and all of the RRHs. The CRS is typically transmitted from each of the transmission points using the same resource elements, and therefore the signals collide. When each of the transmission points has the same cell ID, CRS transmitted from each of the transmission points may not be differentiated. In certain aspects, when the RRHs have different cell IDs, the CRS transmitted from each of the TxPs using the same resource elements may or may not collide. Even in the case, when the RRHs have different cell IDs and the CRS collide, advanced UEs may differentiate CRS transmitted from each of the TxPs using interference cancellation techniques and advanced receiver processing.

In certain aspects, when all transmission points are configured with the same cell ID and CRS is transmitted from all transmission points, proper antenna virtualization is needed if there are an unequal number of physical antennas at the transmitting macro node and/or RRHs. That is, CRS is to be transmitted with an equal number of CRS antenna ports. For example, if the node 802 and the RRHs 804, 806, 808 each have four physical antennas and the RRH 810 has two physical antennas, a first antenna of the RRH 810 may be configured to transmit using two CRS ports and a second antenna of the RRH 810 may be configured to transmit using a different two CRS ports. Alternatively, for the same deployment, macro 802 and RRHs 804, 806, 808, may transmit only two CRS antenna ports from selected two out of the four transmit antennas per transmission point. Based on these examples, it should be appreciated that the number of antenna ports may be increased or decreased in relation to the number of physical antennas.

As discussed supra, when all transmission points are configured with the same cell ID, the macro node 802 and the RRHs 804-810 may all transmit CRS. However, if only the macro node 802 transmits CRS, outage may occur close to an RRH due to automatic gain control (AGC) issues. In such a scenario, CRS based transmission from the macro 802 may be received at low receive power while other transmissions originating from the close-by RRH may be received at much larger power. This power imbalance may lead to the aforementioned AGC issues.

In summary, typically, a difference between same/different cell ID setups relates to control and legacy issues and other potential operations relying on CRS. The scenario with different cell IDs, but colliding CRS configuration may have similarities with the same cell ID setup, which by definition has colliding CRS. The scenario with different cell IDs and colliding CRS typically has the advantage compared to the same cell ID case that system characteristics/components which depend on the cell ID (e.g., scrambling sequences, etc.) may be more easily differentiated.

The exemplary configurations are applicable to macro/RRH setups with same or different cell IDs. In the case of different cell IDs, CRS may be configured to be colliding, which may lead to a similar scenario as the same cell ID case but has the advantage that system characteristics which depend on the cell ID (e.g., scrambling sequences, etc.) may be more easily differentiated by the UE).

In certain aspects, an exemplary macro/RRH entity may provide for separation of control/data transmissions within the transmission points of this macro/RRH setup. When the cell ID is the same for each transmission point, the PDCCH may be transmitted with CRS from the macro node 802 or both the macro node 802 and the RRHs 804-810, while the PDSCH may be transmitted with channel state information reference signal (CSI-RS) and demodulation reference signal (DM-RS) from a subset of the transmission points. When the cell ID is different for some of the transmission points, PDCCH may be transmitted with CRS in each cell ID group. The CRS transmitted from each cell ID group may or may not collide. UEs may not differentiate CRS transmitted from multiple transmission points with the same cell ID, but may differentiate CRS transmitted from multiple transmission points with different cell IDs (e.g., using interference cancellation or similar techniques).

In certain aspects, in the case where all transmission points are configured with the same cell ID, the separation of control/data transmissions enables a UE transparent way of associating UEs with at least one transmission point for data transmission while transmitting control based on CRS transmissions from all the transmission points. This enables cell splitting for data transmission across different transmission points while leaving the control channel common. The term "association" above means the configuration of antenna ports for a specific UE for data transmission. This is different from the association that would be performed in the context of handover. Control may be transmitted based on CRS as discussed supra. Separating control and data may allow for a faster reconfiguration of the antenna ports that are used for a UE's data transmission compared to having to go through a handover process. In certain aspects, cross transmission point feedback may be possible by configuring a UE's antenna ports to correspond to the physical antennas of different transmission points.

In certain aspects, UE-specific reference signals enable this operation (e.g., in the context of LTE-A, Rel-10 and above). CSI-RS and DM-RS are the reference signals used in the LTE-A context. Interference estimation may be carried out based on or facilitated by CSI-RS muting. When control channels are common to all transmission points in the case of a same cell ID setup, there may be control capacity issues because PDCCH capacity may be limited. Control capacity may be enlarged by using FDM control channels. Relay PDCCH (R-PDCCH) or extensions thereof, such as an enhanced PDCCH (ePDCCH) may be used to supplement, augment, or replace the PDCCH control channel.

Power Control and User Multiplexing for CoMP

Various techniques have been considered for joint processing across heterogeneous networks coordinated multipoint (HetNet CoMP) eNBs. For example, within a macro cell coverage, multiple remote radio heads (RRHs) may be deployed to enhance capacity/coverage of a network. As discussed above, these RRHs may have a same cell ID as the macro cell, such that a single frequency network (SFN) is formed for downlink (DL) transmission. However, many issues may be encountered in the uiplink (UL) for such a HetNet CoMP scheme. One problem may be that with a same physical cell identifier (PCI) for all cells, only one common reference signal power spectral density (CRS PSD) may be broadcasted. However, RRH and macro cell may have 16-20 dB power difference. This mismatch may lead to a large error in open loop power control (OL PC). Another problem may be that if only the macro cell transmits CRS, and no RRHs transmit CRS, a UE close to an RRH may transmit a very large UL signal to jam the reception for the RRH. These problems may lead to performance degradations.

The following disclosure discusses various ways to improve UL power control for different HetNet CoMP scenarios. In addition, various UL CoMP receiver and processing options, and UL channel configuration options are also discussed.

In certain aspects, various eNB power classes may be defined in HetNet CoMP. For example, macro cells with 46 dBm (nominal), pico cells with 30 dBm (nominal), or 23 and 37 dBm, RRH with 30 dBm (nominal) or 37 dBm possible, and Femto cells with 20 dBm (nominal).

A pico cell typically has its own physical cell identifier (PCI), may have X2 connection with a macro cell, may have own scheduler operation, and may link to multiple macro cells. An RRH may or may not have a same PCI as macro cell, may have fiber connection with the macro cell, and may have its scheduling performed only at the macro cell. A femto cell may have restricted association and is typically not considered for CoMP schemes.

UL CoMP Processing

In certain aspects, various CoMP processing schemes may be defined when all cells or a subset of cells receive UL data, control and sounding reference signal (SRS).

In a first aspect, macro diversity reception may be defined for a subset of cells. For this aspect, whichever of the subset of cells successfully decodes the UL reception, may forward a decision to the serving cell.

In a second aspect, joint processing may be defined by combining log likelihood ratio (LLR) from a subset of cells. In this aspect, there may be a need to move LLRs to the serving cell.

In a third aspect, joint multi-user detection may be defined. This may include using different cyclic shifts/Walsh codes among users within a large macro/RRH region to separate users' channel(s). In an aspect, interference cancellation (IC) may be carried out for interfering users among all cells since all information is shared among all cells. In another aspect, data separation may be defined by spatial division multiple access SDMA, UL MU-MIMO etc.

In a fourth aspect, UL CoMP with Rel-11 UEs may be defined. In this aspect, MIMO/beamforming (BF) may be based on the SRS channel transmitted from multiple antennas. Further, precoding matrix selection may be chosen by the serving eNB based on SRS. Also, joint processing may be performed from multiple UL cells. In an aspect, code book design may be reused for UL since they are transmitter (Tx) driven.

UL Power Control

In certain aspects, for HetNet CoMP schemes where the macro cell and one or more RRHs share a same PCI, two scenarios may exist. In a first scenario, only the macro cell may transmit the CRS, PSS, SSS and/or PBCH. In an alternate scenario, both macro and RRHs may transmit the CRS, PSS, SSS and/or PBCH.

Figure 9:
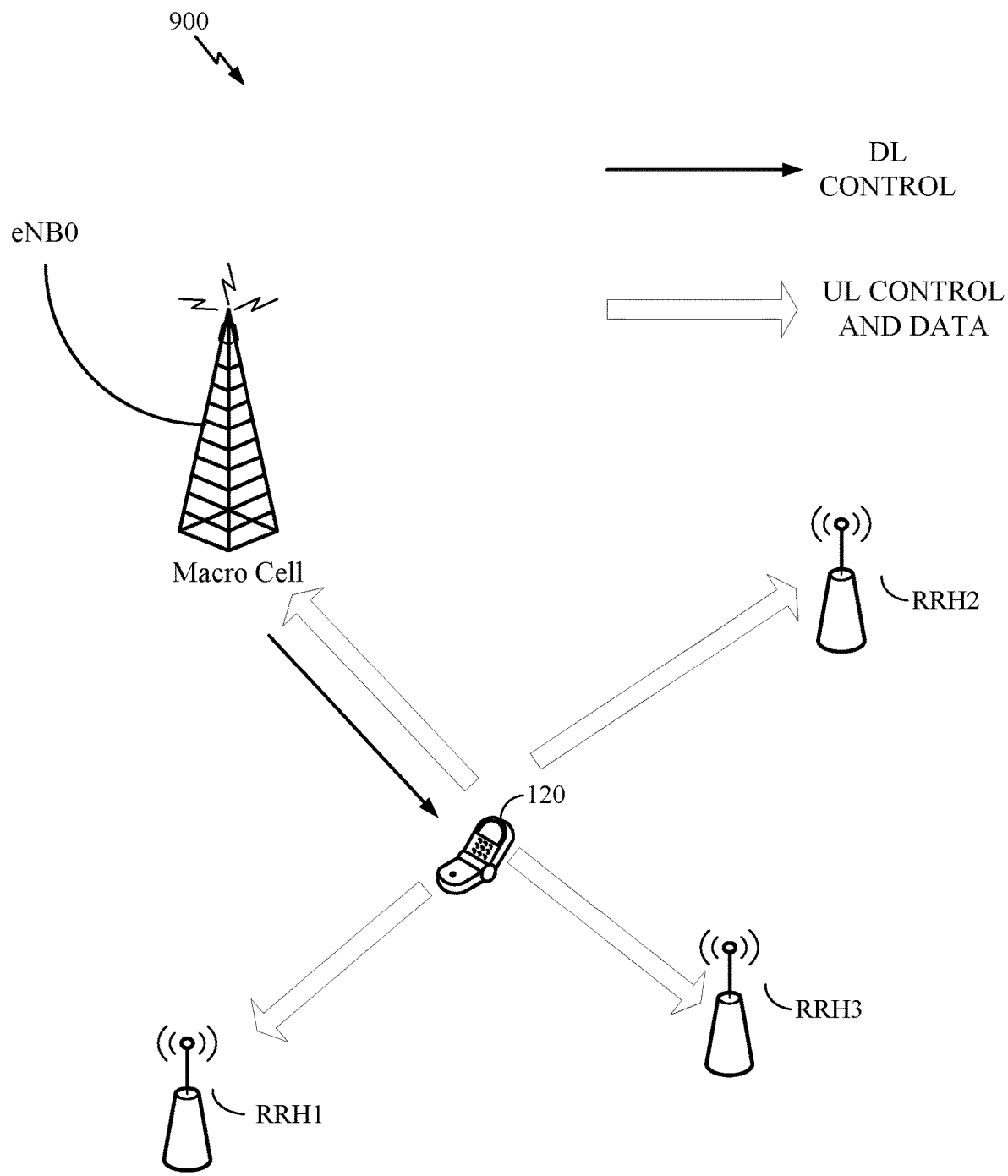
FIG. 9 illustrates an example scenario for HetNet CoMP where only the macro cell transmits a common reference signal (CRS) in accordance with certain aspects of the present disclosure.

FIG. 9 illustrates an example scenario 900 for HetNet CoMP where only the macro cell transmits a common reference signal (CRS) in accordance with certain aspects of the present disclosure. The heterogeneous network of FIG. 9 includes eNB0 associated with a macro cell and multiple RRHs that may be associated with pico cells including RRH1, RRH2 and RRH3. The RRHs 1, 2 and 3 may be connected with the eNB0 via optical fiber cables. UE 120 may communicate with the eNB0 as well as the RRHs 1, 2, and 3. eNB0 may transmit the CRS while the RRHs remain silent. In certain aspects, for DL, control may be based on the macro cell and data may be based on SFN from all cells (including macro and pico cells) or a subset of cells with UE-reference signals (RS) for downlink. On the other hand, for UL, both control and data may be received on multiple cells (e.g. eNB0 as well as one or more RRHs).

In certain aspects, with DL CRS measurement from one cell (e.g. eNB0) and UL reception from multiple cells (RRHs 1, 2 and 3), open loop power control (OL PC) may be inaccurate since DL path loss (PL) may be measured at the UE 120 based on CRS from the macro cell (eNB0) only. In this scenario, OL PC may be accurate if UL is received by macro cell only.

Various power control options may be defined to address this problem. For example, in a first aspect, additional back off/reduction of transmit power from the UE 120 may be defined in OL PC algorithm to take into account the UL macro diversity gain or joint processing gain due to processing of UL signals by a plurality of transmission points. This additional reduction in transmit power of the UE may be signaled from eNB0 to the UE 120, for example to adjust P0 factor. In certain aspects, the P0 factor defines a target received power at the eNB0 for a random access channel (RACH) that is set to a low value to allow low initial transmit power of the RACH. In an aspect, the P0 factor is determined and/or signaled to adjust the OL PC based on differences between path loss between the UE and one or more transmission points involved in DL CoMP operations and one or more transmission points involved in UL CoMP operations. In an aspect, eNB may also signal one or more parameters that represents a path loss difference between DL and UL serving nodes, which may be used by the UE in OL PC. In certain aspects, this method may be applicable to CoMP operations involving different DL transmission points and UL reception points.

In a second aspect, closed loop power control may be performed based on SRS transmitted from the UE 120. In an aspect, joint processing of the SRS may be carried out by the same cooperating cells as used for data. The closed loop PC may be based on the SRS channel signal to noise ratio (SNR) with an offset between PUSCH and SRS.

In a third aspect, a slow start random access channel RACH transmit power may be defined so that it will not jam the close by cells.

Figure 10:
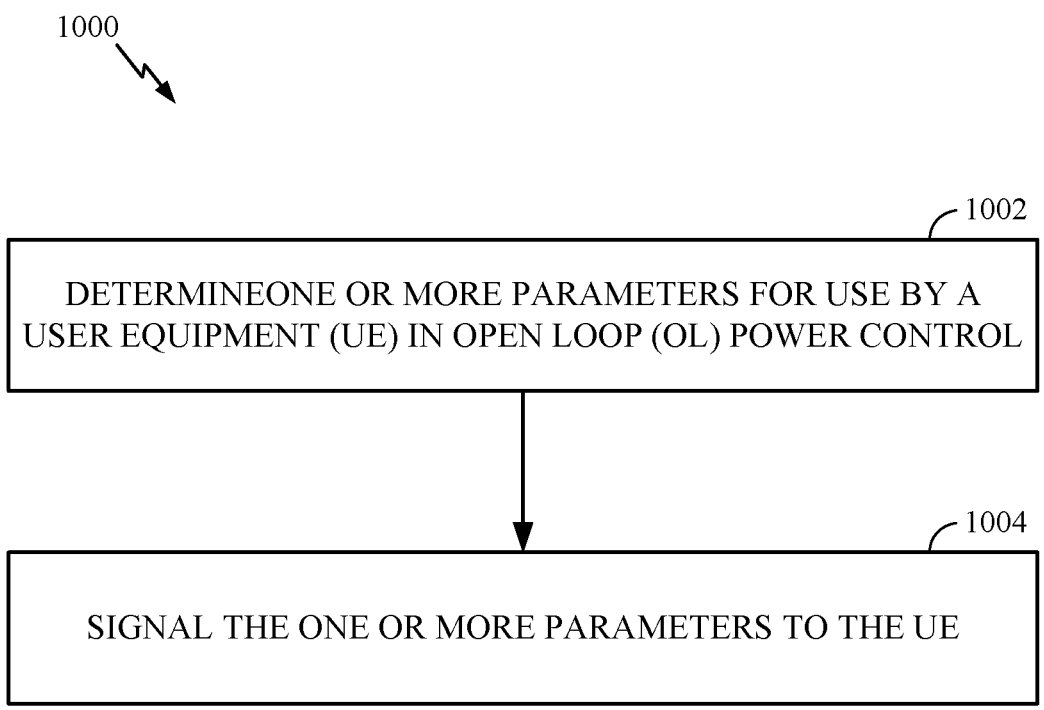
FIG. 10 illustrates example operations 1000, performed at a base station, for uplink power control, in accordance with certain aspects of the disclosure.

FIG. 10 illustrates example operations 1000, performed at a base station, for uplink power control, in accordance with certain aspects of the disclosure. Operations 1000 may be executed, for example at processor(s) 330 and/or 340 of the eNB 110. Operations 1000 being, at 1002, by determining one or more parameters for use by a UE in OL PC, wherein the one or more parameters are determined to take into account CoMP operations. At 1004, the one or more parameters may be signaled to the UE.

Figure 10A:
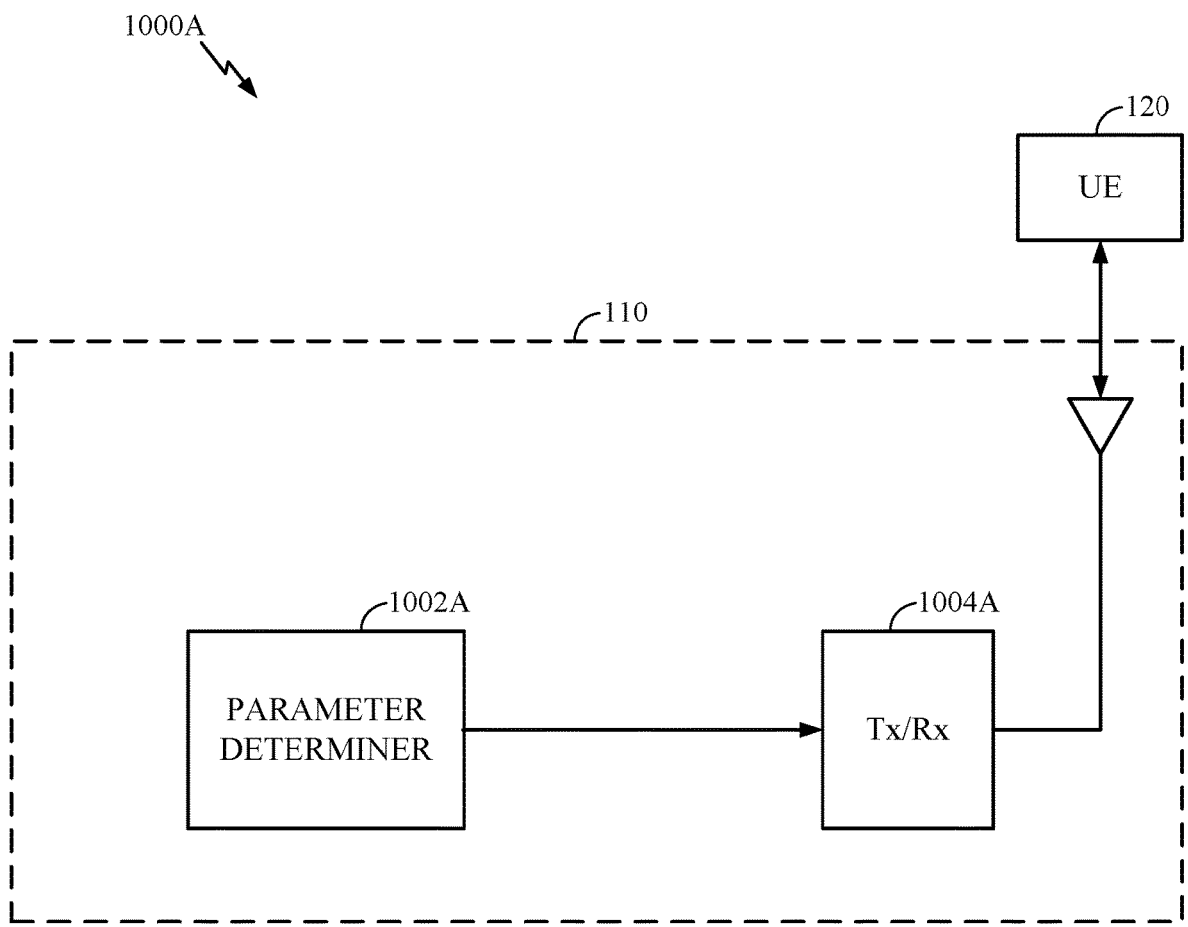
FIG. 10A illustrates example components capable of performing the operations illustrated in FIG. 10 in accordance with certain aspects of the present disclosure.

The operations 1000 described above may be performed by any suitable components or other means capable of performing the corresponding functions of FIG. 10. For example, operations 1000 illustrated in FIG. 10 correspond to components 1000A illustrated in FIG. 10A. In FIG. 10A, a parameter determiner 1002A may determine one or more parameters for use by a UE 120 in OL PC. A transmitter 1004A may transmit the one or more parameters to the UE 120.

In certain aspects, when UE 120 is close to an RRH (e.g. RRH 1, 2 or 3 having common cell ID), it may have large DL path loss from the eNB0, but a small path loss to the close by RRH. In this scenario, UL transmission based on OL PC may jam the RRH. Thus, a UE 120 close to an RRH, which is not transmitting CRS and is far away from the eNB0 may have very high signal power to jam the RRH based on the OL PC.

Various power control options may be defined to address this problem. In a first aspect, OL PC may be performed based on CSI-RS instead of CRS. In an aspect, a different CSI-RS may be transmitted from each transmission point and the UE 120 may perform OL PC based on a strongest CSI-RS. In a second aspect, noise padding may be carried at the RRH. In certain aspects, the UE may receive signaling indicating at least one of location or power spectrum density (PSD) of CSI-RS for each of a set of transmission points. In an aspect, the signaling may be conveyed to the UE in a system information block (SIB).

Figure 11:
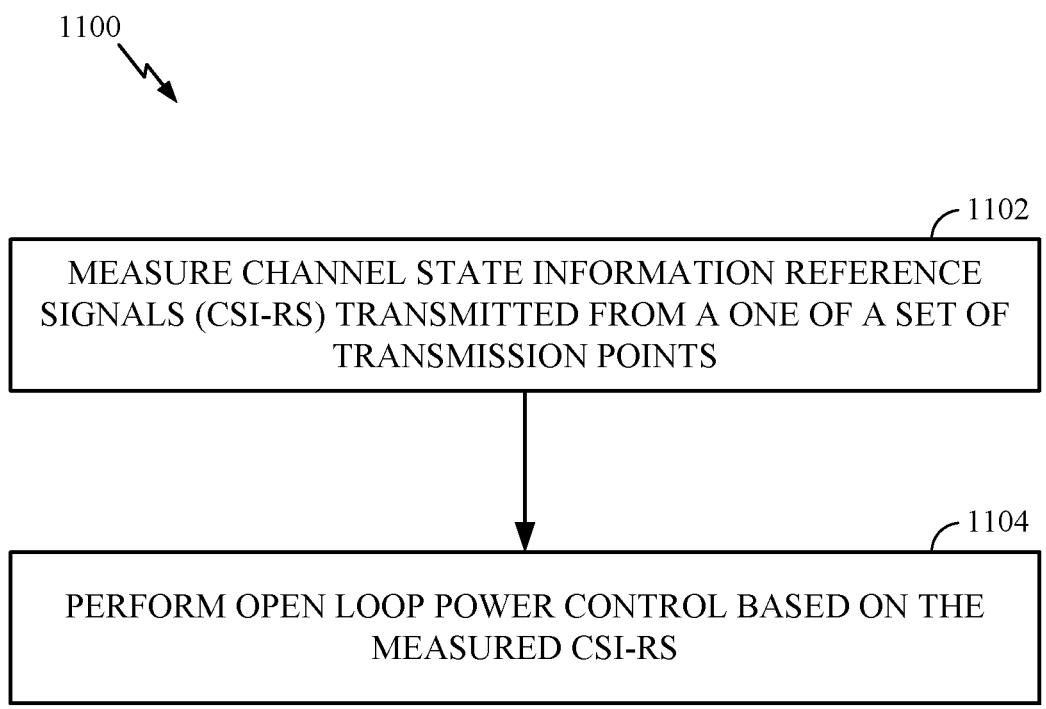
FIG. 11 illustrates example operations, performed by a UE, for uplink power control to avoid jamming a close by RRH, in accordance with certain aspects of the present disclosure.

FIG. 11 illustrates example operations 1100, performed by a UE, for uplink power control to avoid jamming a close by RRH, in accordance with certain aspects of the present disclosure. Operations 1100 may be executed, for example at processor(s) 358 and/or 380 of the UE 120. Operations 1100 may being, at 1102, by measuring CSI-RS transmitted from at least one of a set of transmission points involved in CoMP operations with the UE. At 1104, OL PC may be performed based on the measured CSI-RS from at least one of the transmission points.

Figure 11A:
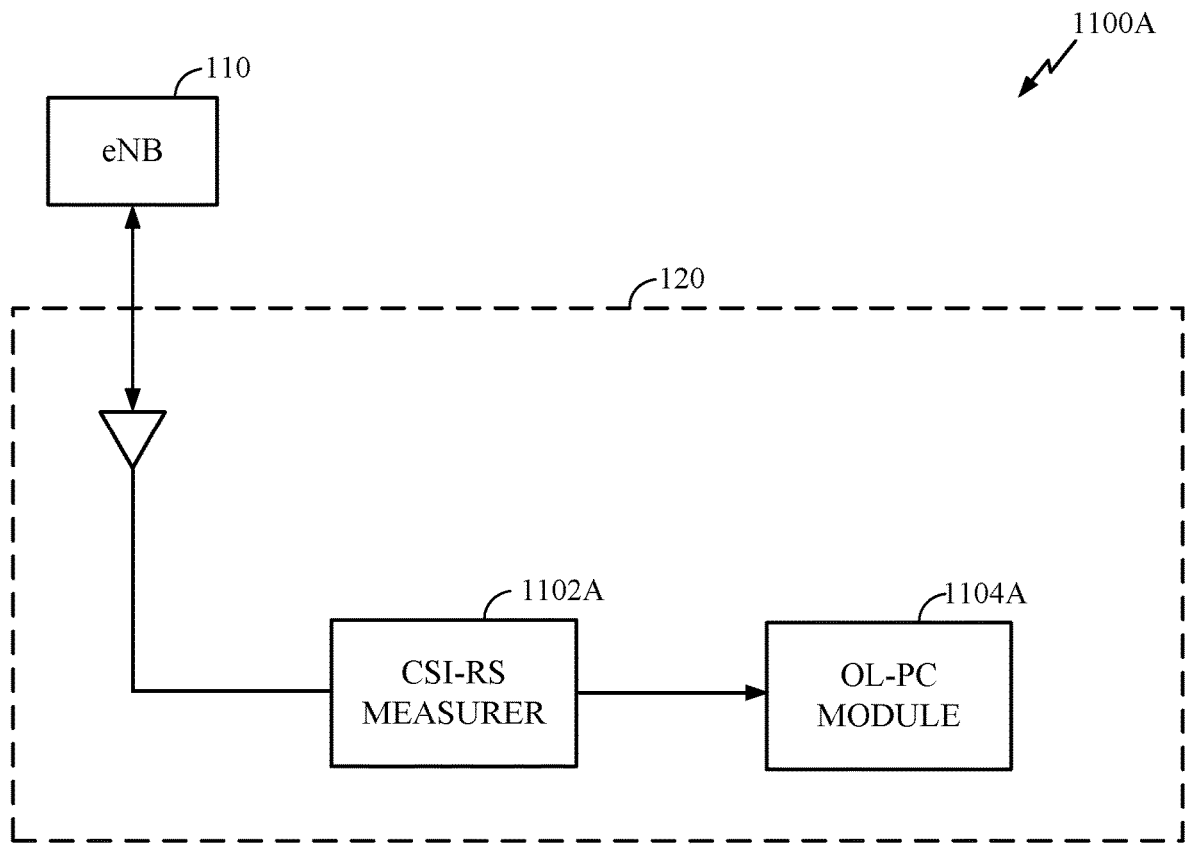
FIG. 11A illustrates example components capable of performing the operations illustrated in FIG. 11 in accordance with certain aspects of the present disclosure.

The operations 1100 may be performed by any suitable components or other means capable of performing the corresponding functions of FIG. 11. For example, the operations 1100 illustrated in FIG. 11 correspond to components 1100A illustrated in FIG. 11A.

Figure 12:
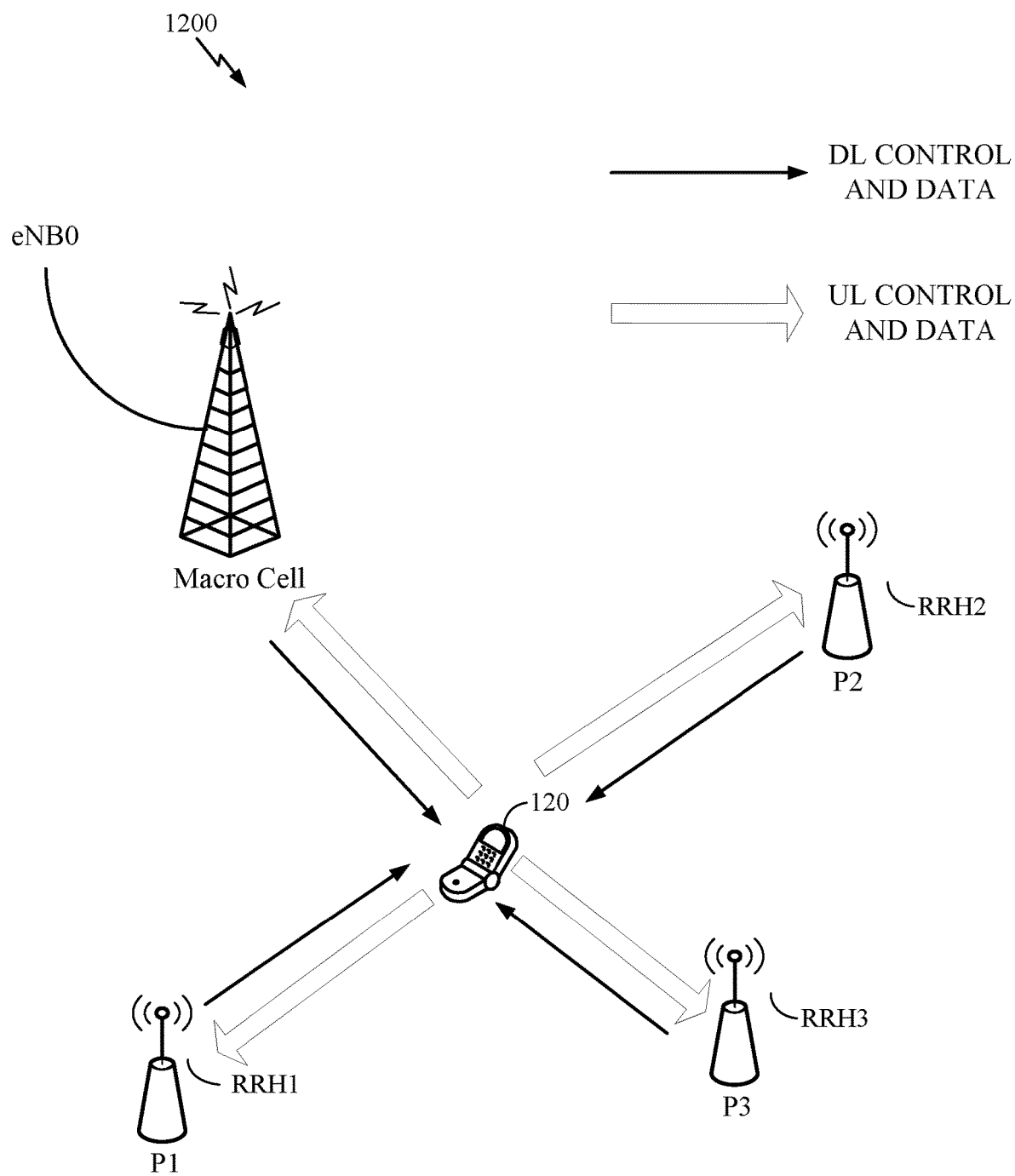
FIG. 12 illustrates an example scenario for HetNet CoMP where both macro and pico cells transmit a same CRS in accordance with certain aspects of the present disclosure.

FIG. 12 illustrates an example scenario 1200 for HetNet CoMP where both macro and pico cells transmit a same CRS in accordance with certain aspects of the present disclosure. The heterogeneous network of FIG. 12 includes eNB0 (P0) associated with a macro cell and multiple RRHs associated with pico cells including RRH1 (P1), RRH2 (P2) and RRH3 (P3). eNB0 and the RRHs may communicate with UE 120. As noted above the RRHs may be connected with eNB0 via fiber optic cables. In this scenario, both eNB0 and the RRHs may transmit the same CRS. In certain aspects, for DL, both control and data may be based on SFN from all cells and a data channel may have additional beam-forming with UE-RS. Further, for UL, both the control and data may be received on multiple cells (diversity or joint processing on UL).

In certain aspects, only one reference signal power spectral density (RS PSD) level may be advertized in this scenario, but eNB0 and RRH may have different RS levels, which may lead to a mismatch in RS power levels. That is, the DL SFN transmission from different transmission points may possibly be with different PSD levels of CRS and the UE 120 and may not be able to differentiate CRS level from path loss (PL) difference. For example, for P1 and P2 with path losses PL1 and PL2, the received signal on DL may be R1=P1*PL1+P2*PL2, and the received signal on the UL is R2=P(PL1+PL2). Thus, the measured may not be reciprocal between DL and UL.

The mismatch in the DL RS levels at the UE 120, transmitted from different transmission points may be addressed in various ways. In a first aspect, CRS PSD level from all cells may be maintained at a same level so that DL PL may be applied to UL PL. This may however be unlikely due to the Macro/Pico/RRH power difference.

In a second aspect, macro and RRH may send different system information block 1 (SIB1) with different PDCCH. SIB1 from macro and RRH may be transmitted in different frequency locations as indicated by PDCCH. The UE 120 may detect both PDCCH and both SIB1. SIB1 from Macro/RRH may contain CRS or CSI-RS level from Macro/RRH. From PDCCH and SIB1 signal strength, UE 120 may determine which cell is the strongest DL cell and apply open loop power control based on the strongest DL as well as its CRS or CSI-RS level.

In a third aspect, macro eNB0 may advertize two sets of information in its system information block (SIB). One, positions of all cells including Macro eNB0 and RRH {x0, x1, x2, . . . xn}, and two, PSD of CRS or CSI-RS of all cells including macro eNB0 and RRH in the same order {p0, p1, . . . , pn}. In an aspect, from positions of the cell as well its own GPS location, UE 120 may find the distance from each of the cells and perform random access channel (RACH) procedure to either the closest cell or to the cell with the smallest path loss. In an aspect, from all the information above and with the received signal strength, the UE 120 may calculate approximate path loss from each of the cells.

In certain aspects, when the macro eNB0 and the pico RRHs transmit a same CRS, DL PL measurement may be based on the SFN from all cells. However, UL transmission may only be based on diversity or joint processing from a subset of cells. This may lead to a mismatch between DL and UL processing. This problem may be addressed in various ways.

In a aspects, transmit power based on open loop power control may be adjusted depending on the difference between the DL transmission cells and the UL reception cells.

In certain aspects, PL calculation may be based on CSI-RS which may be unique from each cell, and the OL PC and closed loop PC may take into account participating UL CoMP cells.

UL Multiplexing

In certain aspects, both DL CoMP and UL CoMP grouping may depend on accurate sounding of the channel. For an RRH with the same PCI as macro eNB, there may be no differentiation of CSI-RS and SRS from different RRH. In certain aspects, to address this issue, for both CSI-RS and SRS, the configuration/scrambling etc may be decoupled from the common PCI that the RRH may have.

Figure 13:
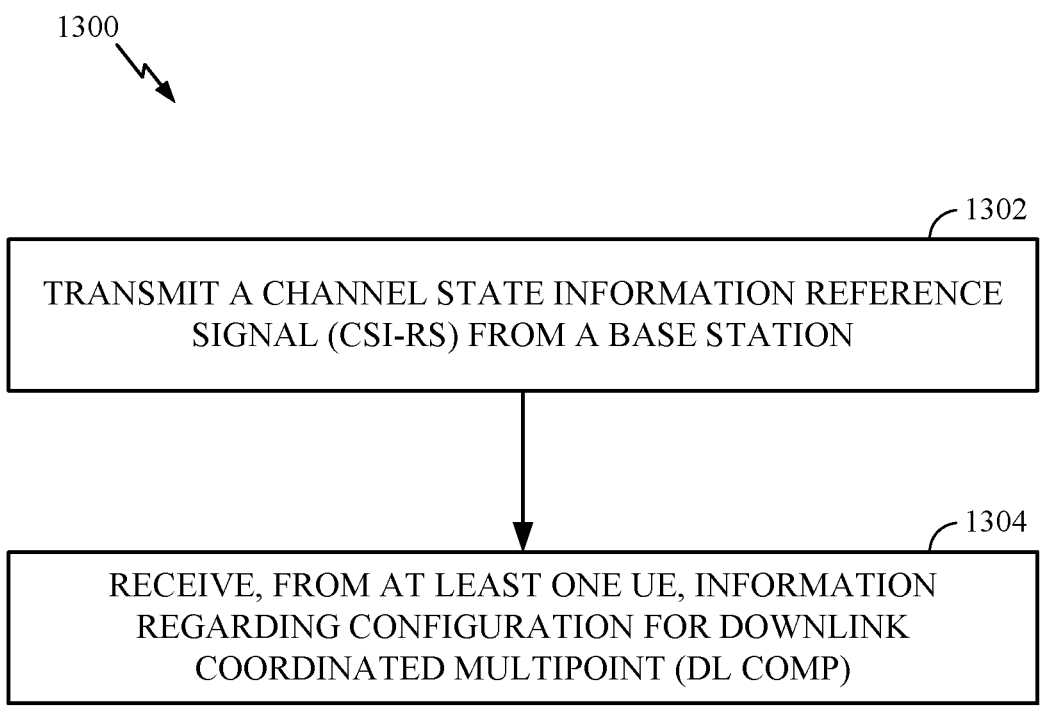
FIG. 13 illustrates example operations, performed by a base station, for grouping of cells associated with DL CoMP, in accordance with certain aspects of the present disclosure.

In an aspect, for DL CoMP, different CSI-RS may be transmitted from different cells, even when a same PCI is used in the different RRHs. FIG. 13 illustrates example operations 1300, performed by a base station, for grouping of cells associated with DL CoMP, in accordance with certain aspects of the present disclosure. Operations 1300 may be executed for example at processor(s) 330, 338 and/or 340 of the eNB 110.

Operations 1300 may begin, at 1302, by determining a channel state information reference signal (CSI-RS), the CSI-RS being different from CSI-RS transmitted by one or more other transmission points sharing a common physical cell identifier (PCI) with the base station, the CSI-RS being decoupled from the PCI. At 1304, the CSI-RS is transmitted from the base station. In certain aspects, CSI-RS configuration comprises a CSI-RS sequence and a frequency location.

Figure 13A:
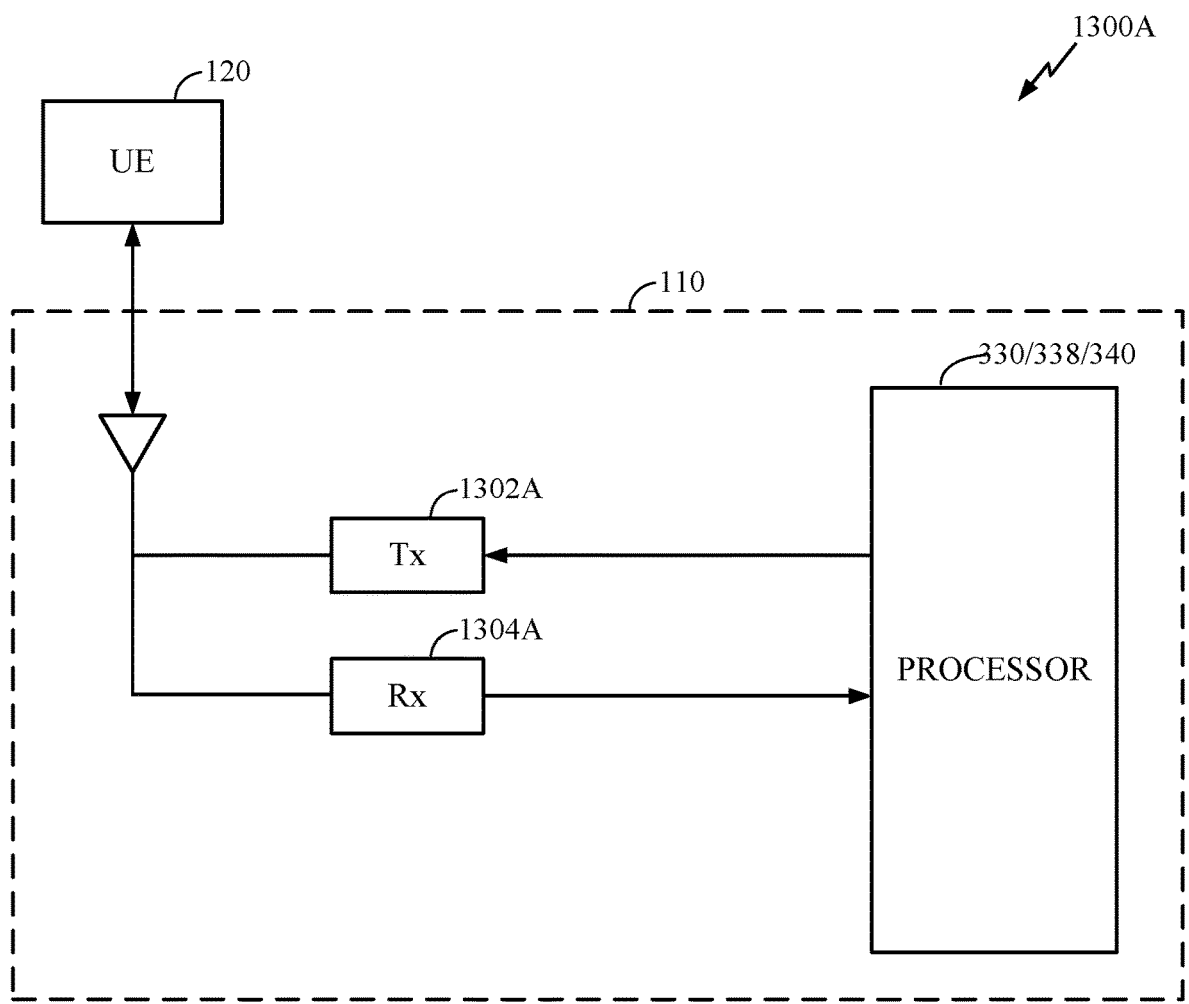
FIG. 13A illustrates example components capable of performing the operations illustrated in FIG. 13 in accordance with certain aspects of the present disclosure.

The operations 1300 described above may be performed by any suitable components or other means capable of performing the corresponding functions of FIG. 13. For example, operations 1300 illustrated in FIG. 13 correspond to components 1300A illustrated in FIG. 13A. In FIG. 13A, a CSI-RS determiner 1302A may determine a CSI-RS and a transmitter 1304A may transmit the CSI-RS.

In an aspect, for UL CoMP, different SRS may be transmitted from different UEs, including UEs in proximity to RRHs with a same PCI. One or more transmission points receiving the different SRS may determine a grouping of cells for UL CoMP for a UE based on SRS transmitted by one or more UEs, and transmit the grouping to the UEs.

Figure 14:
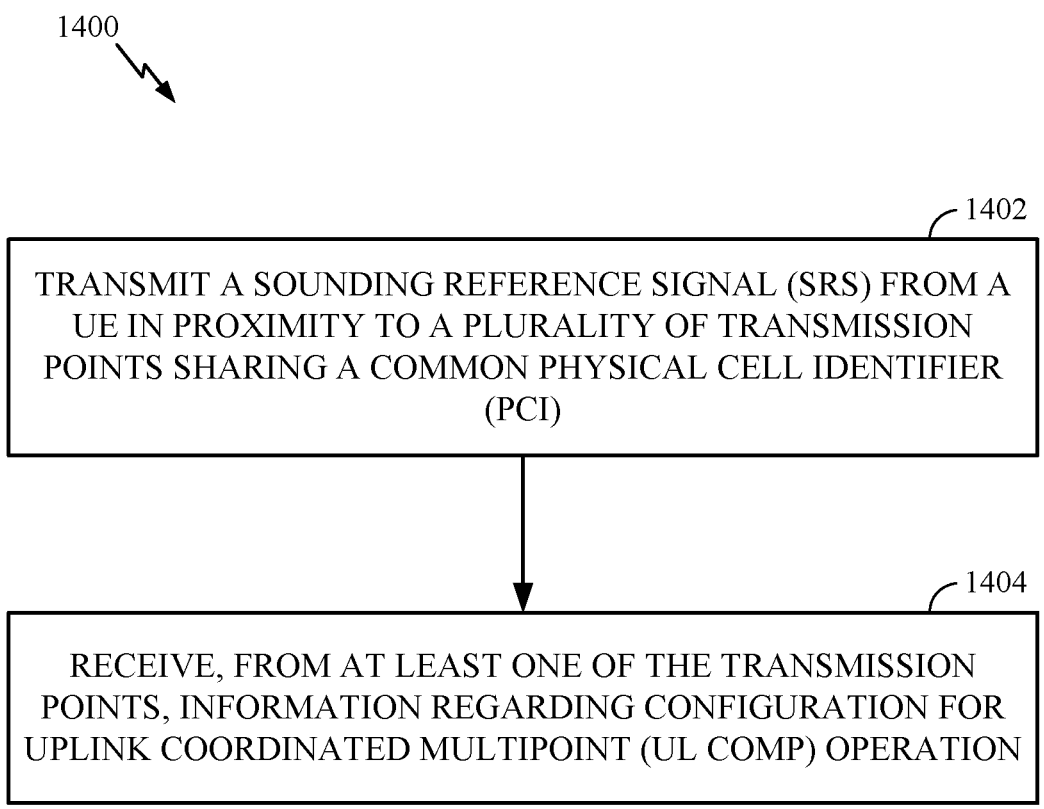
FIG. 14 illustrates example operations, performed by a UE, for grouping of cells associated with UL CoMP, in accordance with certain aspects of the present disclosure

FIG. 14 illustrates example operations 1400, performed by a UE, for grouping of cells associated with UL CoMP, in accordance with certain aspects of the present disclosure. Operations 1400 may be executed, for example at processor(s) 358, 364 and/or 380.

Operations 1400 may begin, at 1402, by transmitting a sounding reference signal (SRS) from the UE in proximity to a plurality of transmission points sharing a common physical cell identifier (PCI). At 1404, information may be received, from at least one of the transmission points, regarding configuration for uplink coordinated multipoint (UL CoMP) operation, the configuration being decoupled from the PCI.

Figure 14A:
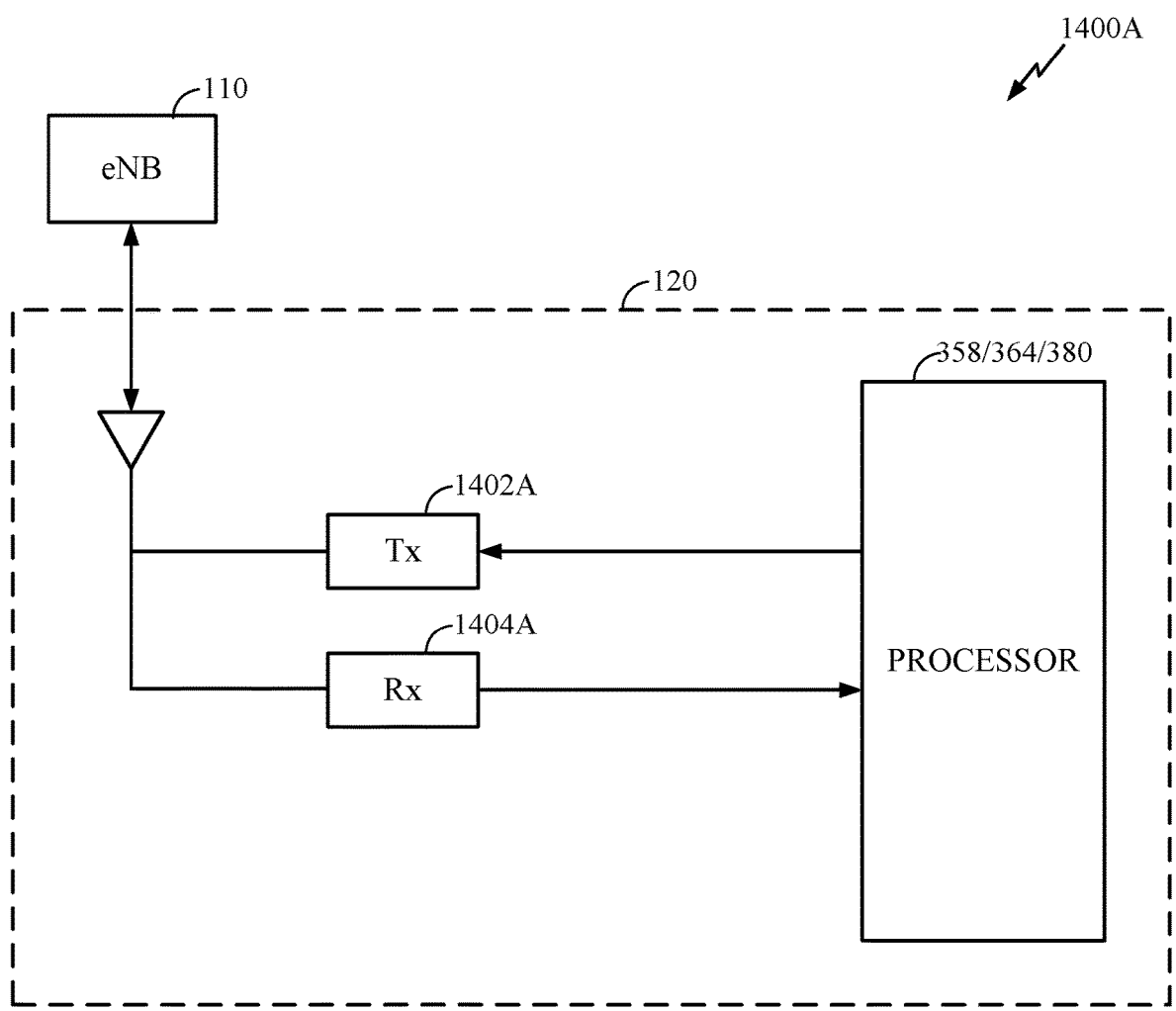
FIG. 14A illustrates example components capable of performing the operations illustrated in FIG. 14 in accordance with certain aspects of the present disclosure

The operations 1400 described above may be performed by any suitable components or other means capable of performing the corresponding functions of FIG. 14. For example, operations 1400 illustrated in FIG. 14 correspond to components 1400A illustrated in FIG. 14A. In FIG. 14A, the transmitter 1402A may transmit an SRS from the UE 120 and the receiver 1404A may receive information regarding configuration for UL CoMP from at least one eNB 110. The transmitted SRS and the received UL CoMP configuration may be processed at processor 358/364/380.

In certain aspects, current SRS separation is provided by root sequence, cyclic shift, frequency location, and comb, where root sequence is PCI dependent. In an aspect, for RRHs with the same PCI, root sequence selection may be increased and multiple roots may be used within the same macro/RRH region.

In certain aspect, for CSI-RS based CoMP grouping, where a joint processing/Macro diversity group is determined based on DL CSI-RS, each cell may transmit distinct CSI-RS pattern as noted above. In an aspect, the UE may determine and/or select both DL CoMP cells as well as UL CoMP cells based on a received signal strength of the CSI-RS from each cell. In an aspect, this selection of UL CoMP cells may be fed back to serving eNB. Alternatively, PL from each cell, calculated based on the CSI-RS, may be fed back to the serving eNB and the serving eNB may make the UL CoMP decision. Also, there may be a need to offset the difference in transmit power when deciding on the UL CoMP, so that UL CoMP is strictly based on PL from different cells.

In certain aspects, for SRS based UL CoMP grouping, where a joint processing/macro diversity group is determined based on SRS, the UE may transmit SRS (as noted above), and a group of cells with strong SRS received signal may participate in UL joint processing.

Figure 15:
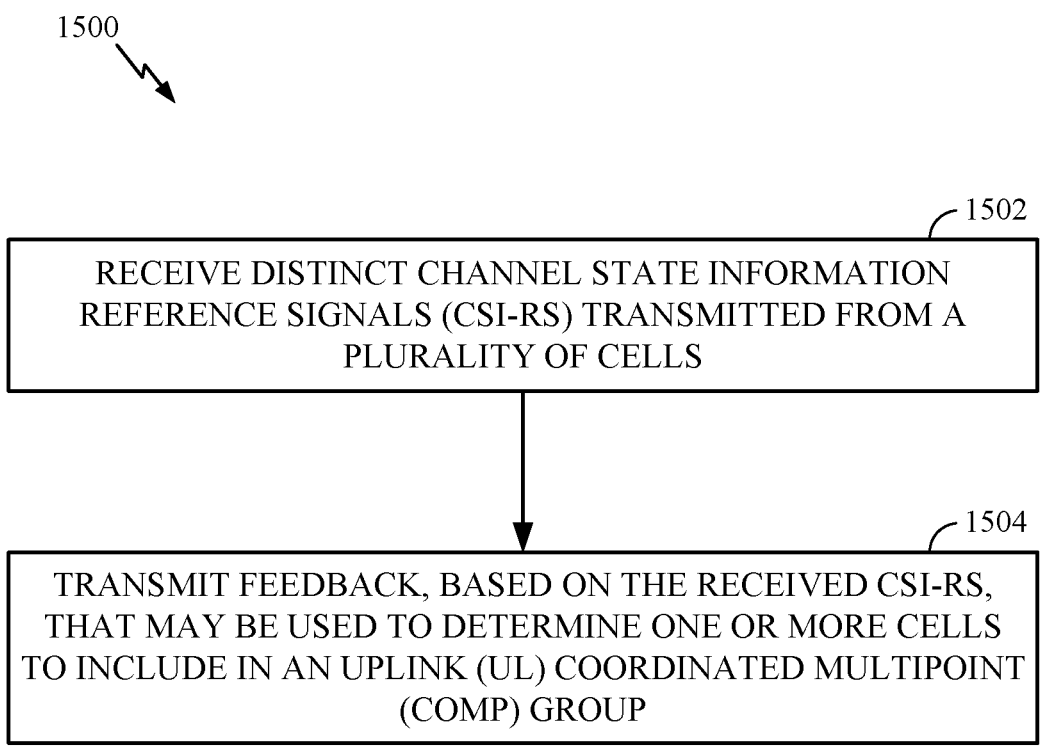
FIG. 15 illustrates example operations, performed by a UE, for grouping of cells associated with CoMP, in accordance with certain aspects of the present disclosure

FIG. 15 illustrates example operations 1500, performed by a UE, for grouping of cells associated with CoMP, in accordance with certain aspects of the present disclosure. Operations 1500 may be executed, for example at processor(s) 358, 364 and/or 380.

Operations 1500 may being, at 1502, by receiving distinct CSI-RS transmitted from a plurality of cells. At 1504, a feedback may be transmitted based on the received CSI-RS, that may be used to determine one or more cells to include in a UL CoMP group.

Figure 15A:
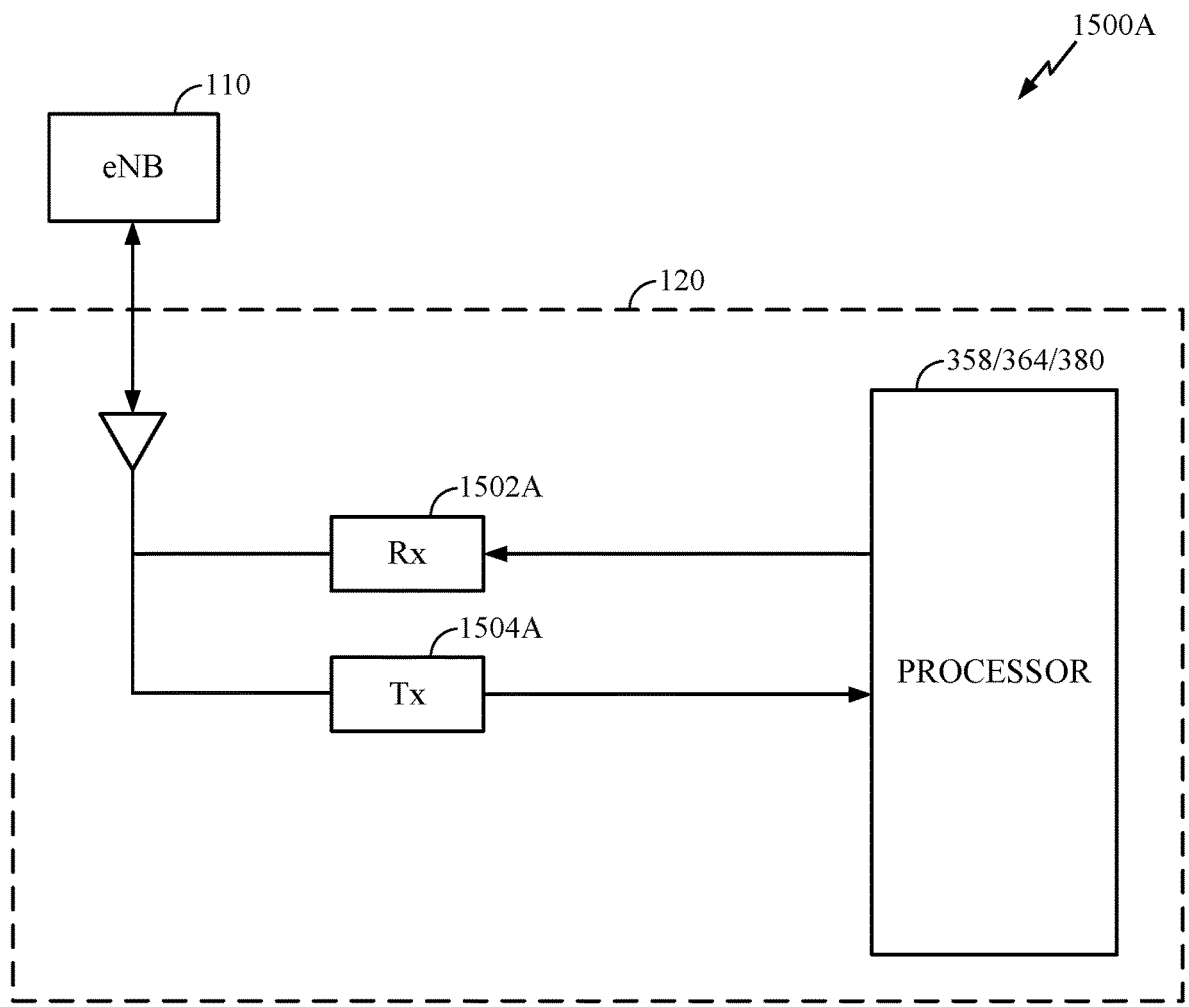
FIG. 15A illustrates example components capable of performing the operations illustrated in FIG. 15 in accordance with certain aspects of the present disclosure

The operations 1500 described above may be performed by any suitable components or other means capable of performing the corresponding functions of FIG. 15. For example, operations 1500 illustrated in FIG. 15 correspond to components 1500A illustrated in FIG. 15A. In FIG. 15A, a receiver 1502A may receive CSI-RS transmitted from a plurality of cells (e.g eNB 110) and a transmitter 1504A may transmit feedback based on the received CSI-RS. A processor 358/364/380 may process the received CSI-RS and the feedback to be transmitted from the UE 120.

Figure 16:
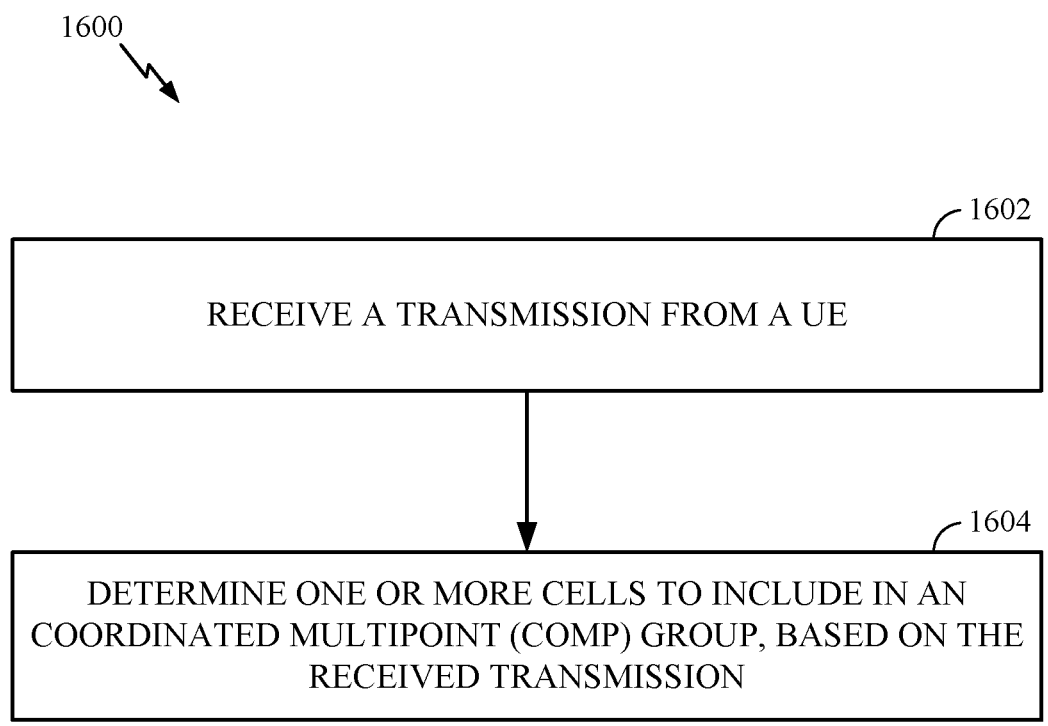
FIG. 16 illustrates example operations, performed by a base station, for grouping of cells associated with UL CoMP, in accordance with certain aspects of the present disclosure.

FIG. 16 illustrates example operations 1600, performed by a base station, for grouping of cells associated with UL CoMP, in accordance with certain aspects of the present disclosure. Operations 1600 may be executed for example at processor(s) 330, 338 and/or 340 of the eNB 110.

Operations 1600 may being, at 1602, by receiving a transmission from a UE. At 1604, one or more cells may be determined to include in a CoMP group, based on the received transmission.

Figure 16A:
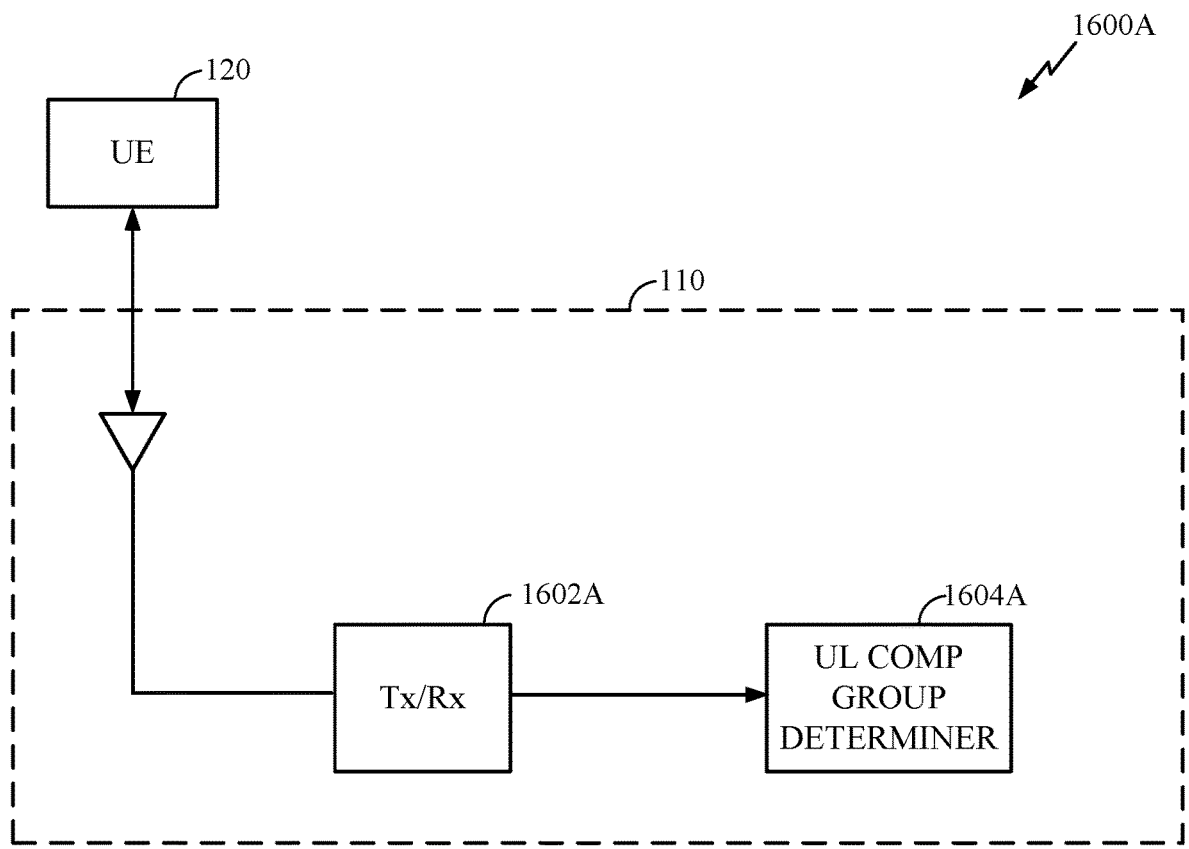
FIG. 16A illustrates example components capable of performing the operations illustrated in FIG. 16 in accordance with certain aspects of the present disclosure

The operations 1600 described above may be performed by any suitable components or other means capable of performing the corresponding functions of FIG. 16. For example, operations 1600 illustrated in FIG. 16 correspond to components 1600A illustrated in FIG. 16A. In FIG. 16A, a receiver 1602A may receive a transmission from a UE and a UL CoMP group determiner 1604A may determine one or more cells to include in a UL CoMP group, based on the received transmission.

PUCCH Transmission/Reception Options

In certain aspects, localized transmission may be made to every one's closest cell. This aspect may include separate PUCCH configuration from PCI. Each cell may have an option to signal its own users about the channel quality indication (CQI) configuration for CQI transmission. Further, CQI pool may be increased by allowing different CGS among different RRH and macro even with the same PCI.

Figure 17:
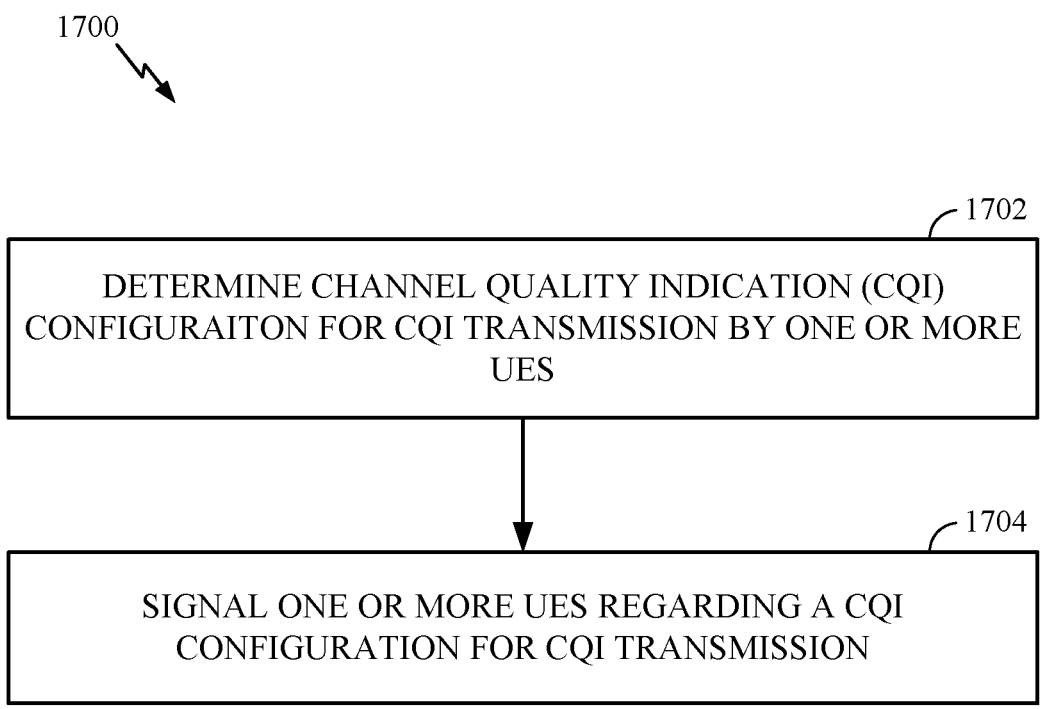
FIG. 17 illustrates example operations, by a transmission point involved in CoMP operations, in accordance with certain aspects of the present disclosure

FIG. 17 illustrates example operations 1700, by a transmission point involved in CoMP operations, in accordance with certain aspects of the present disclosure. Operations 1700 may be executed for example at processor(s) 330, 338 and/or 340 of the eNB 110.

Operations 1700 may begin, at 1702, by determining channel quality indication (CQI) configuration for CQI transmission by one or more UEs. At 1704, the one or more UEs may be signaled the CQI configuration for the CQI transmission, wherein the signaled CQI configuration is decoupled from physical cell identifier (PCI) of the transmission point.

Figure 17A:
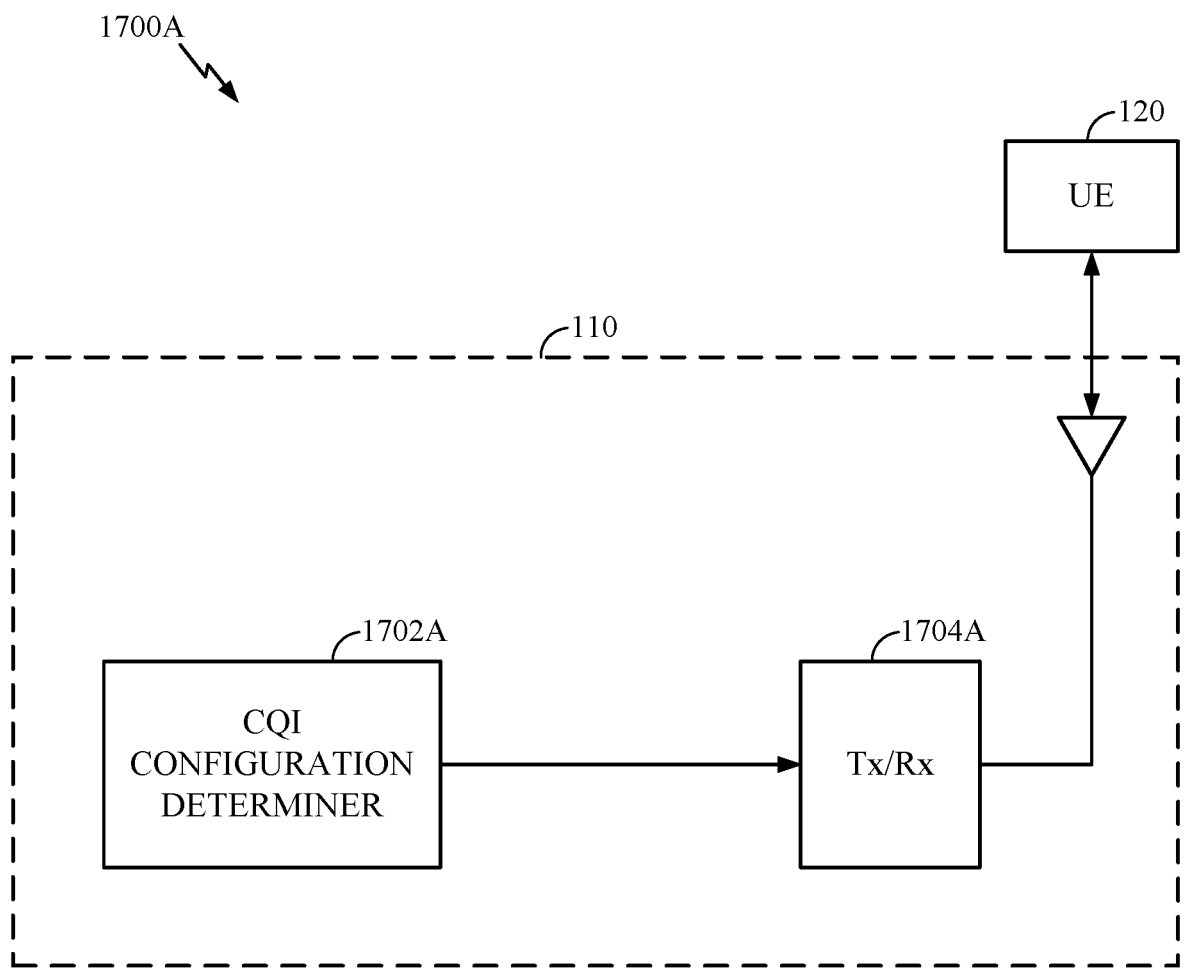
FIG. 17A illustrates example components capable of performing the operations illustrated in FIG. 17 in accordance with certain aspects of the present disclosure

The operations 1700 described above may be performed by any suitable components or other means capable of performing the corresponding functions of FIG. 17. For example, operations 1700 illustrated in FIG. 17 correspond to components 1700A illustrated in FIG. 17A. In FIG. 17A, a CQI configuration determiner 1702A may determine CQI configuration for CQI transmission by one or more UEs. A transmitter 1704A may signal one or more UEs regarding the CQI configuration for the CQI transmission.

In certain aspects, transmission may be made to multiple participating cells. In this aspect, one anchor cell may be responsible to signal the PUCCH configuration. Further, this aspect may include separate control channel reception region from data channel reception. For example, a reduced CoMP group for PUCCH may reduce processing load. Also, for example, larger PUCCH CoMP group comparing to PUSCH due to less transfer.

Figure 18:
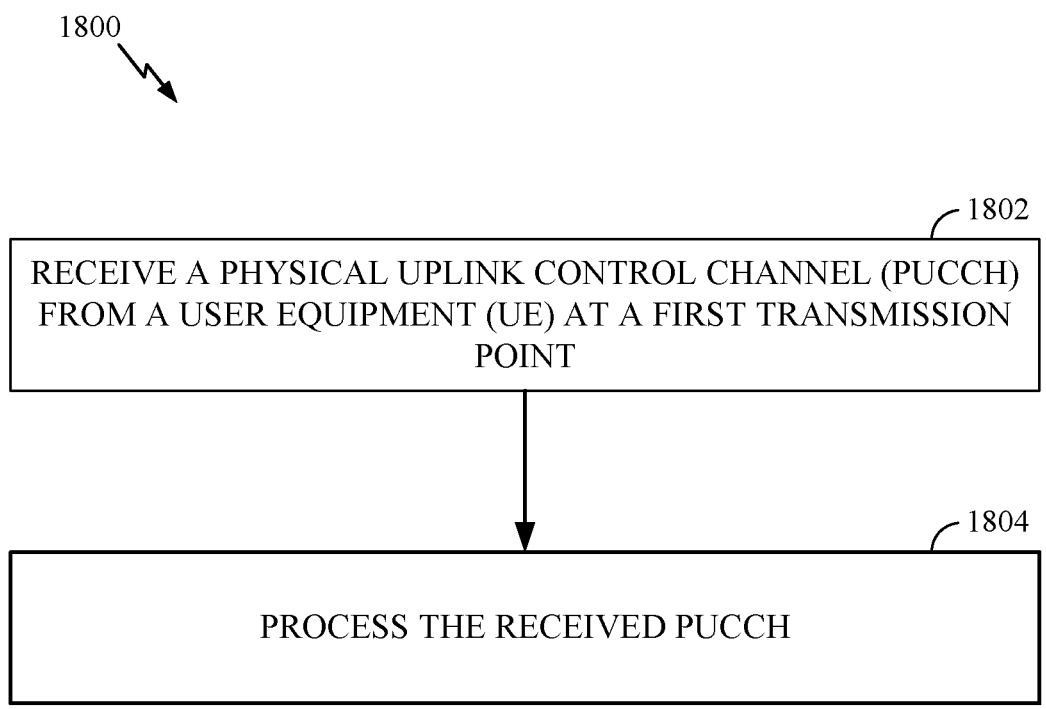
FIG. 18 illustrates example operations, by a transmission point involved in CoMP operations, in accordance with certain aspects of the present disclosure

FIG. 18 illustrates example operations 1800, by a transmission point involved in CoMP operations, in accordance with certain aspects of the present disclosure. Operations 1800 may be executed for example at processor(s) 330, 338 and/or 340 of the eNB 110.

Operations 1800 may being, at 1802, by receiving a physical uplink control channel (PUCCH) configuration from a first transmission point participating in coordinated multipoint (CoMP) operations with one or more other transmission points. At 1804, a PUCCH may be transmitted to a first set of one or more transmission points in accordance with the PUCCH configuration. At 1806, a PUSCH may be transmitted to a second set of one or more transmission points different from than the first set of transmission points.

Figure 18A:
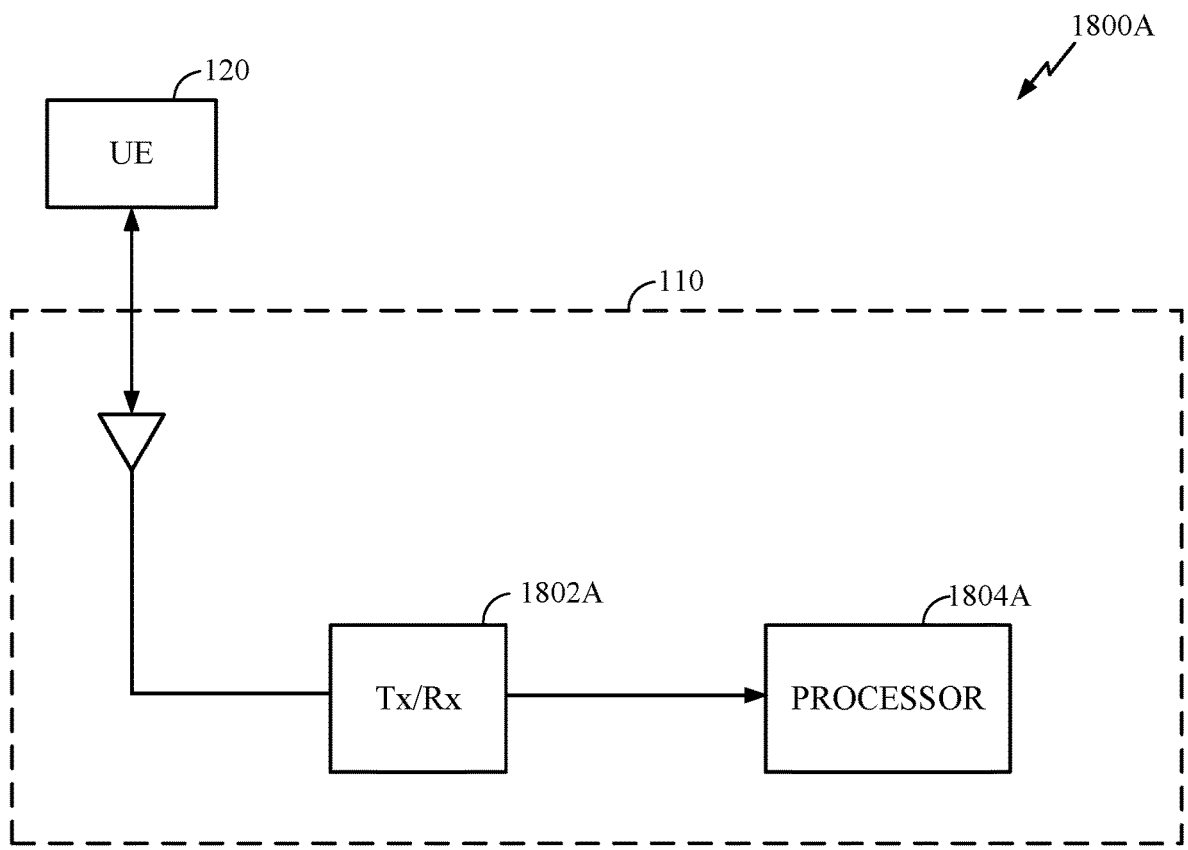
FIG. 18A illustrates example components capable of performing the operations illustrated in FIG. 18 in accordance with certain aspects of the present disclosure

The operations 1800 described above may be performed by any suitable components or other means capable of performing the corresponding functions of FIG. 18. For example, operations 1800 illustrated in FIG. 18 correspond to components 1800A illustrated in FIG. 18A. In FIG. 18A, a receiver 1802A may receive a physical uplink control channel (PUCCH) configuration from a first transmission point. A transmitter 1804A/1806A may transmit a PUCCH to a first set of one or more transmission points and may transmit a PUSCH to a second set of one or more transmission points.

In certain aspects, CQI content may be reporting the DL signal quality from M cells. CQI uplink transmission may be received from N cells. This aspect may include separate CQI reporting DL cell set from CQI configuration for UL cell set.

Figure 19:
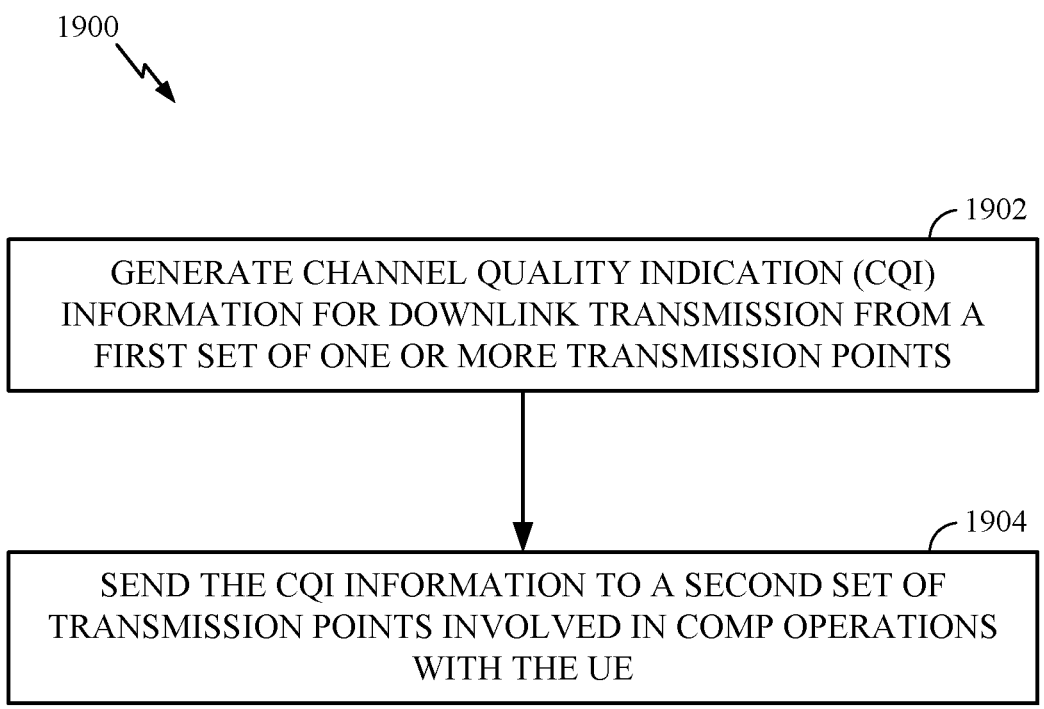
FIG. 19 illustrates example operations, performed by a UE involved in CoMP operations, in accordance with certain aspects of the present disclosure.

FIG. 19 illustrates example operations 1900, performed by a UE involved in CoMP operations, in accordance with certain aspects of the present disclosure. Operations 1900 may be executed, for example at processor(s) 358, 364 and/or 380.

Operations 1900 may being, at 1902, by generating CQI information for downlink transmission from a first set of one or more transmission points involved in CoMP operations with the UE. At 1904, the CQI information may be sent to a second set of transmission points involved in CoMP operations with the UE.

Figure 19A:
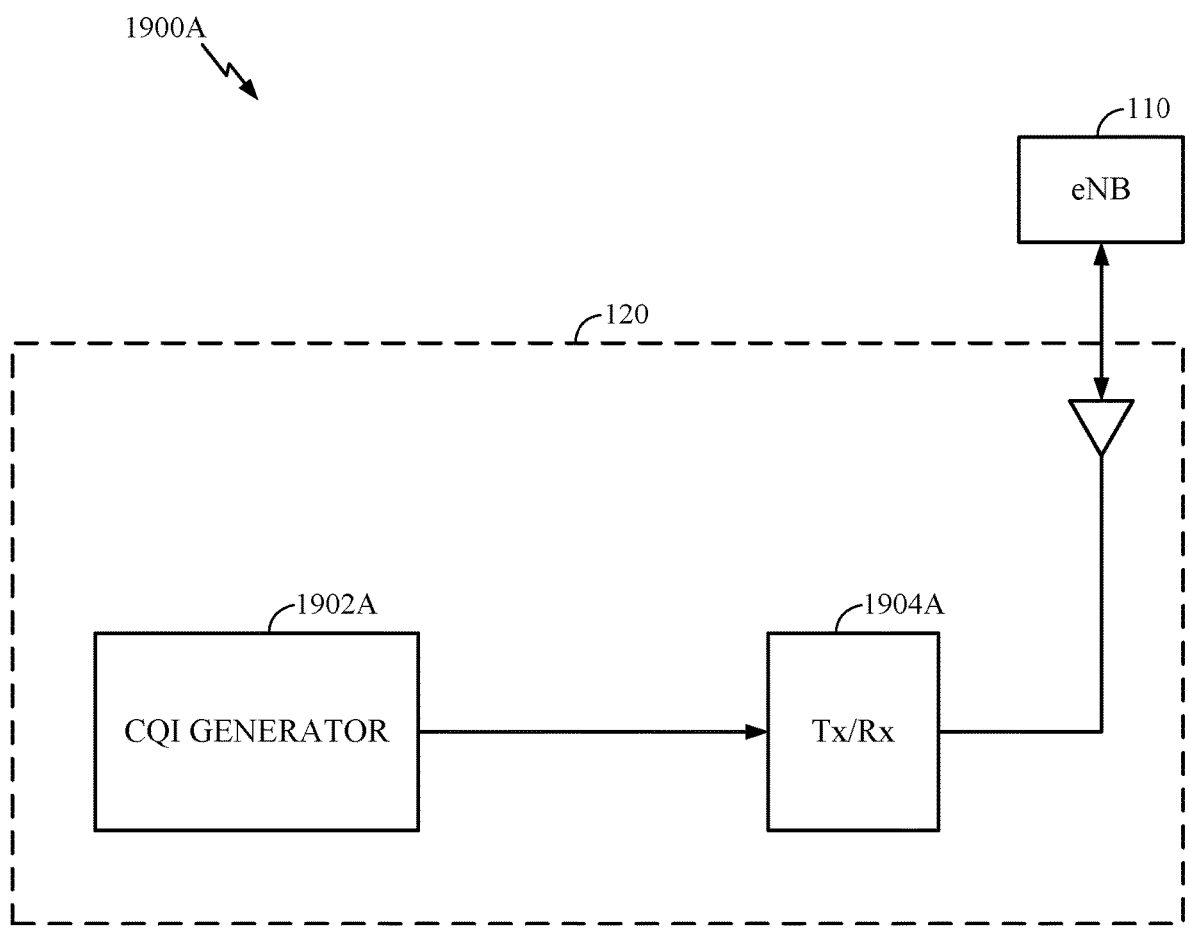
FIG. 19A illustrates example components capable of performing the operations illustrated in FIG. 19 in accordance with certain aspects of the present disclosure

The operations 1900 described above may be performed by any suitable components or other means capable of performing the corresponding functions of FIG. 19. For example, operations 1900 illustrated in FIG. 19 correspond to components 1900A illustrated in FIG. 19A. In FIG. 19A, a CQI generator 1902A may generate CQI for downlink transmission from a first set of one or more transmission points involved in CoMP operations with the UE. A transmitter 1904A may transmit the CQI information to a second set of transmission points involved in CoMP operations with the UE.

In certain aspects, frequency division multiplexing (FDM) of PUCCH between Macro and RRH, may schedule data into PUCCH region for interior users.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
    measuring channel state information reference signals (CSI-RS) transmitted from at least one of a set of transmission points involved in coordinated multipoint (CoMP) operations with the UE, wherein the measurement of the CSI-RS comprises measuring the CSI-RS transmitted from each of the set of transmission points; and
    performing open loop power control based on the measured CSI-RS from the at least one of the transmission points, the open loop power control being based on the strongest of the measured CSI-RSs.

2. The method of claim 1, wherein the CSI-RS transmitted from each of the set of transmission points is different.

3. The method of claim 2, wherein a common cell ID is used for each of the set of transmission points.

4. The method of claim 1, further comprising receiving signaling indicating at least one of location or power spectrum density (PSD) of CSI-RS for each of the set of transmission points.

5. The method of claim 4, wherein the signaling is conveyed in a system information block (SIB).

6. An apparatus for wireless communications, comprising:
    means for measuring channel state information reference signals (CSI-RS) transmitted from at least one of a set of transmission points involved in coordinated multipoint (CoMP) operations with a user-equipment (UE), wherein the means for measuring of the CSI-RS comprises means for measuring the CSI-RS transmitted from each of the set of transmission points; and
    means for performing open loop power control based on the measured CSI-RS from the at least one of the transmission points, the means for performing the open loop power control being based on the strongest of the measured CSI-RSs.

7. The apparatus of claim 6, wherein the CSI-RS transmitted from each of the set of transmission points is different.

8. The apparatus of claim 7, wherein a common cell ID is used for each of the set of transmission points.

9. The apparatus of claim 6, further comprising means for receiving signaling indicating at least one of location or power spectrum density (PSD) of CSI-RS for each of the set of transmission points.

10. The apparatus of claim 9, wherein the signaling is conveyed in a system information block (SIB).

11. An apparatus for wireless communications, comprising:
    at least one processor configured to:
        measure channel state information reference signals (CSI-RS) transmitted from at least one of a set of transmission points involved in coordinated multipoint (CoMP) operations with a UE, wherein the measurement of the CSI-RS comprises measuring the CSI-RS transmitted from each of the set of transmission points; and
        perform open loop power control based on the measured CSI-RS from the at least one of the transmission points, the open loop power control being based on the strongest of the measured CSI-RSs; and a memory coupled to the at least one processor.

12. A computer-program product for wireless communications, comprising a non-transitory computer-readable medium having code, that when executed by a processor, performs:

measuring channel state information reference signals (CSI-RS) transmitted from at least one of a set of transmission points involved in coordinated multipoint (CoMP) operations with a UE, wherein the measurement of the CSI-RS comprises measuring the CSI-RS transmitted from each of the set of transmission points; and performing open loop power control based on the measured CSI-RS from the at least one of the transmission points, the open loop power control being based on the strongest of the measured CSI-RSs.

13. A method for wireless communications by a base station, comprising:

determining one or more parameters for use by a user equipment (UE) in open loop (OL) power control, wherein the one or more parameters are determined to take into account coordinated multipoint (CoMP) operations, wherein the one or more parameters are determined to take into account at least one of uplink (UL) macro diversity gain or joint processing gain; and signaling the one or more parameters to the UE.

14. The method of claim 13, wherein the CoMP operations comprise different DL transmission points and UL reception points.

15. The method of claim 13, wherein at least one of the one or more parameters comprises a parameter representing a target power received at the base station for a random access channel (RACH) that is set to a low value to allow low initial transmit power of the RACH.

16. The method of claim 13, wherein the one or more parameters are determined to adjust open loop power control based on differences between path loss between the UE and one or more transmission points involved in downlink (DL) CoMP operations and one or more transmission points involved in uplink (UL) CoMP operations.

17. The method of claim 13, wherein the one or more parameters comprise a parameter that represents path loss difference between DL and UL serving nodes.

18. An apparatus for wireless communications, comprising:

means for determining one or more parameters for use by a user equipment (UE) in open loop (OL) power control, wherein the one or more parameters are determined to take into account coordinated multipoint (CoMP) operations, wherein the one or more parameters are determined to take into account at least one of uplink (UL) macro diversity gain or joint processing gain; and means for signaling the one or more parameters to the UE.

19. The apparatus of claim 18, wherein the COMP operations comprise different DL transmission points and UL reception points.

20. The apparatus of claim 18, wherein at least one of the one or more parameters comprises a parameter representing a target power received at a base station for a random access channel (RACH) that is set to a low value to allow low initial transmit power of the RACH.

21. The apparatus of claim 18, wherein the one or more parameters are determined to adjust open loop power control based on differences between path loss between the UE and one or more transmission points involved in downlink (DL) CoMP operations and one or more transmission points involved in uplink (UL) CoMP operations.

22. The apparatus of claim 18, wherein the one or more parameters comprise a parameter that represents path loss difference between DL and UL serving nodes.

23. An apparatus for wireless communications, comprising:

at least one processor configured to:

determine one or more parameters for use by a user equipment (UE) in open loop (OL) power control, wherein the one or more parameters are determined to take into account coordinated multipoint (ColVIP) operations, wherein the one or more parameters are determined to take into account at least one of uplink (UL) macro diversity gain or joint processing gain; and signal the one or more parameters to the UE; and a memory coupled to the at least one processor.

24. A computer-program product for wireless communications, comprising a non-transitory computer-readable medium comprising code, that when executed by a processor, performs:

determining one or more parameters for use by a user equipment (UE) in open loop (OL) power control, wherein the one or more parameters are determined to take into account coordinated multipoint (CoMP) operations, wherein the one or more parameters are determined to take into account at least one of uplink (UL) macro diversity gain or joint processing gain; and signaling the one or more parameters to the UE.

* * * * *